US009566506B2

(12) United States Patent
Han et al.

(10) Patent No.: US 9,566,506 B2
(45) Date of Patent: Feb. 14, 2017

(54) VIRTUAL WORLD PROCESSING DEVICE AND METHOD

(75) Inventors: Seung Ju Han, Yongin-si (KR); Jae Joon Han, Yongin-si (KR); Do Kyoon Kim, Yongin-si (KR); Won Chul Bang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 13/380,318

(22) PCT Filed: Jun. 23, 2010

(86) PCT No.: PCT/KR2010/004091
§ 371 (c)(1),
(2), (4) Date: Mar. 19, 2012

(87) PCT Pub. No.: WO2010/151054
PCT Pub. Date: Dec. 29, 2010

(65) Prior Publication Data
US 2012/0188237 A1 Jul. 26, 2012

Related U.S. Application Data

(60) Provisional application No. 61/255,363, filed on Oct. 28, 2009.

(30) Foreign Application Priority Data

Jun. 25, 2009 (KR) .................. 10-2009-0057313
Oct. 23, 2009 (KR) .................. 10-2009-0101434
(Continued)

(51) Int. Cl.
*A63F 13/211* (2014.01)
*A63F 13/30* (2014.01)
(Continued)

(52) U.S. Cl.
CPC .............. *A63F 13/211* (2014.09); *A63F 13/06* (2013.01); *A63F 13/10* (2013.01); *A63F 13/12* (2013.01);
(Continued)

(58) Field of Classification Search
CPC .................. A63F 2300/6045; A63F 2300/105; A63F 13/06; A63F 2300/8082; G06T 19/006
See application file for complete search history.

(56) References Cited

U.S. PATENT DOCUMENTS 8,566,292 B2* 10/2013 Primm ................ G06F 11/3058
707/694
2007/0290671 A1* 12/2007 Skultety-Betz et al. ........ 324/67
(Continued)

FOREIGN PATENT DOCUMENTS

JP  2004-021528 A  1/2004
JP  2006-65518 A  3/2006
(Continued)

OTHER PUBLICATIONS

Japanese Office Action issued Apr. 1, 2014 in the Japanese Patent Office in corresponding Japanese Application No. 2012-517386.
(Continued)

Primary Examiner — Chante Harrison
Assistant Examiner — Nurun N Flora
(74) Attorney, Agent, or Firm — NSIP Law

(57) ABSTRACT

A virtual world processing apparatus and method. Sensed information, which is information collected by a sensor is inputted. The sensed information is adapted, based on a sensor capability, which is information on capability of the sensor. Accordingly, interoperability between a real world and a virtual world or interoperability between virtual worlds may be achieved.

57 Claims, 16 Drawing Sheets

(30) Foreign Application Priority Data

| Oct. 30, 2009 | (KR) | ............ | 10-2009-0104474 |
|---|---|---|---|
| Jan. 14, 2010 | (KR) | ............ | 10-2010-0003607 |
| Jan. 22, 2010 | (KR) | ............ | 10-2010-0006119 |

(51) Int. Cl.

| *A63F 13/20* | (2014.01) |
|---|---|
| *G06F 3/01* | (2006.01) |
| *G06F 3/16* | (2006.01) |
| *A63F 13/213* | (2014.01) |
| *A63F 13/219* | (2014.01) |
| *A63F 13/216* | (2014.01) |
| *A63F 13/215* | (2014.01) |
| *A63F 13/825* | (2014.01) |
| *A63F 13/217* | (2014.01) |
| *A63F 13/40* | (2014.01) |
| *A63F 13/218* | (2014.01) |
| *A63F 13/44* | (2014.01) |
| *G06T 19/00* | (2011.01) |

(52) U.S. Cl.
CPC ............ *A63F 13/213* (2014.09); *A63F 13/215* (2014.09); *A63F 13/216* (2014.09); *A63F 13/217* (2014.09); *A63F 13/218* (2014.09); *A63F 13/219* (2014.09); *A63F 13/44* (2014.09); *A63F 13/825* (2014.09); *G06F 3/011* (2013.01); *G06F 3/167* (2013.01); *G06T 19/006* (2013.01); *A63F 2300/534* (2013.01); *A63F 2300/69* (2013.01)

(56) References Cited

U.S. PATENT DOCUMENTS

| 2008/0318677 | A1* | 12/2008 | Ohta | ............................ | 463/36 |
|---|---|---|---|---|---|
| 2009/0150802 | A1 | 6/2009 | Do et al. | | |
| 2009/0256817 | A1* | 10/2009 | Perlin | .................. | G06F 3/0233 345/174 |
| 2009/0326851 | A1* | 12/2009 | Tanenhaus | ...................... | 702/96 |
| 2010/0178988 | A1* | 7/2010 | Izuno | ...................... | A63F 13/06 463/43 |
| 2011/0003621 | A1* | 1/2011 | Atsumi | ............. | H04W 52/0254 455/566 |
| 2011/0132089 | A1* | 6/2011 | Jeong | ...................... | G01P 1/023 73/514.32 |

FOREIGN PATENT DOCUMENTS

| JP | 2007-157120 | | 6/2007 |
|---|---|---|---|
| JP | 2007-289413 | A | 11/2007 |
| JP | 2007-300973 | | 11/2007 |
| JP | 2009-3651 | | 1/2009 |
| JP | 2009-112829 | A | 5/2009 |
| JP | 2009-140107 | | 6/2009 |
| KR | 10-0221335 | | 9/1998 |
| KR | 10-0452917 | | 11/2001 |
| KR | 10-0725192 | | 2/2002 |
| KR | 10-2007-0061255 | | 6/2007 |
| WO | WO 97/03740 | | 2/1997 |
| WO | WO2010026843 | * | 3/2010 |

OTHER PUBLICATIONS

International Search Report for PCT/KR2010/004091 mailed Feb. 24, 2011.

Japanese Office Action mailed Dec. 2, 2014 in counterpart Japanese Application No. 2012-517386 (11 pages, in Japanese, with complete English Translation of the substantive portion).

Naver blog page, "Catalyst, Entering Temperature Sensor Market with 12-bit Digital Temperature Sensor" (http://blog.naver.com/msh751115/120057263685), Oct. 18, 2008 (2 pages in English; 1 page in Korean).

Korean Office Action issued on Nov. 5, 2015 in counterpart Korean Patent Application No. 10-2010-0059689 (3 pages in English; 5 pages in Korean).

Japanese Appeal Decision issued on Aug. 2, 2016 in counterpart Japanese Patent Application No. 2012-517386 (10 pages in English; 12 pages in Japanese).

\* cited by examiner

| | | |
|---|---|---|
| 610 Diagram | 600 — grp sidccmd:Sensor Capability Base Attributes<br>601 — unit<br>602 — maxValue<br>603 — minValue<br>604 — offset<br>605 — numOflevels<br>606 — sensitivity<br>607 — SNR<br>608 — accuracy | |
| 620 Attributes | `<unit><maxValue><minValue><offset><numOflevels><sensitivity><SNR><accuracy>` | |
| 630 Source | `<!-- ############################################# -->`<br>`<!-- Definition of SDC Base Attributes         -->`<br>`<!-- ############################################# -->`<br>`<attributeGroup name="SensorCapabilityBaseAttributes">`<br>  `<attribute name="unit" type="cid:unitType" use="optional"/>`<br>631 — `<attribute name="maxValue" type="float" use="optional"/>`<br>632 — `<attribute name="minValue" type="float" use="optional"/>`<br>  `<attribute name="offset" type="float" use="optional"/>`<br>633 — `<attribute name="numOflevels" type="nonNegativeInteger" use="optional"/>`<br>  `<attribute name="sensitivity" type="float" use="optional"/>`<br>  `<attribute name="SNR" type="float" use="optional"/>`<br>  `<attribute name="accuracy" type="float" use="optional"/>`<br>`</attributeGroup>` | |

FIG. 12

| | 900 |
|---|---|
| 910<br>Diagram | ⊟ grp sidccmd:SensorAdaptationPreferenceBaseAttributes<br>901 ― SensorIdRef<br>902 ― SensorAdaptationMode<br>903 ― activate<br>904 ― unit<br>905 ― maxValue<br>906 ― minValue<br>907 ― numOflevels |
| 920<br>Attributes | \<SensorIdRef\>\<SensorAdaptationMode\>\<activate\>\<unit\>\<maxValue\>\<minValue\>\<numOflevels\> |
| 930<br>Source | \<!-- ############################################## --\><br>\<!-- SensorAdaptation Preference Base Attributes --\><br>\<!-- ############################################## --\><br>\<attributeGroup name="SensorAdaptationPrefBaseAttributes"\><br>  \<attribute name="SensorIdRef" type="anyURI" use="optional"/\><br>  \<attribute name="SensorAdaptationMode" type="cid:adaptationModeType" use="optional"/\><br>931 ― \<attribute name="activate" type="boolean" use="optional"/\><br>932 ― \<attribute name="maxValue" type="float" use="optional"/\><br>933 ― \<attribute name="minValue" type="float" use="optional"/\><br>934 ― \<attribute name="numOflevels" type="nonNegativeInteger" use="optional"/\><br>\</attributeGroup\><br>\<simpleType name="adaptationModeType"\><br>  \<restriction base="string"\><br>    \<enumeration value="strict"/\><br>    \<enumeration value="scalable"/\><br>  \</restriction\><br>\</simpleType\> |

VIRTUAL WORLD PROCESSING DEVICE AND METHOD

CROSS-REFERENCE TO RELATED APPLICATIONS

This application is a national phase application, under 35 U.S.C. 371, of International Application No. PCT/KR2010/004091, filed Jun. 23, 2010, which claimed priority to Korean Application No. 10-2009-0057313, filed Jun. 25, 2009, Korean Application No. 10-2009-0101434, filed Oct. 23, 2009, Korean Application No. 10-2009-0104474, filed Oct. 30, 2009, Korean Application No. 10-2010-0003607, filed Jan. 14, 2010, Korean Application No. 10-2010-0006119, filed Jan. 22, 2010 and U.S. Provisional Application No. 61/255,636 filed Oct. 28, 2009, the disclosures of which are incorporated herein by reference.

BACKGROUND

1. Field

Example embodiments of the following description relate to a method and apparatus for processing a virtual world, and more particularly, to a method and apparatus for applying information of a real world to a virtual world.

2. Description of the Related Art

Currently, an interest in experience-type games has been increasing. MICROSOFT CORPORATION introduced "Project Natal" at the "E3 2009" Press Conference. "Project Natal" may provide a user body motion capturing function, a face recognition function, and a voice recognition function by combining MICROSOFT's XBOX 360 game console with a separate sensor device consisting of a depth/color camera and a microphone array, thereby enabling a user to interact with a virtual world without a dedicated controller. In addition, SONY CORPORATION introduced "Wand" which is an experience-type game motion controller. The "Wand" enables interaction with a virtual world through input of a motion trajectory of a controller by applying, to the PLAYSTATION 3 game console, a location/direction sensing technology obtained by combining a color camera, a marker, and an ultrasonic sensor.

The interaction between a real world and a virtual world has two directions. In one direction, data information obtained by a sensor of the real world may be reflected to the virtual world. In the other direction, data information, obtained from the virtual world may be reflected to the real world using an actuator. Embodiments suggest a virtual world processing apparatus and method to apply information obtained through the sensor of the real world to the virtual world in order to achieve the interaction between the real world and the virtual world.

SUMMARY

Additional aspects and/or advantages will be set forth in part in the description which follows and, in part, will be apparent from the description, or may be learned by practice of the invention.

According to example embodiments, there is provided a virtual world processing apparatus to enable interoperability between a virtual world and a real world or interoperability between virtual worlds, the apparatus including an input unit to be inputted with sensed information collected by a sensor from the real world, and an adapting unit to adapt the sensed information, based on sensor capability related to the sensor.

According to example embodiments, sensed information which is information collected by a sensor is inputted. The sensed information is adapted, based on a sensor capability, which is information on capability of the sensor. Accordingly, interoperability between a real world and a virtual world or interoperability between virtual worlds may be achieved.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 is a view illustrating syntax of sensor capability base attributes, according to example embodiments;

FIG. 12 is a view illustrating syntax of sensor adaptation preference base attributes, according to example embodiments;

DETAILED DESCRIPTION

Figure 1:
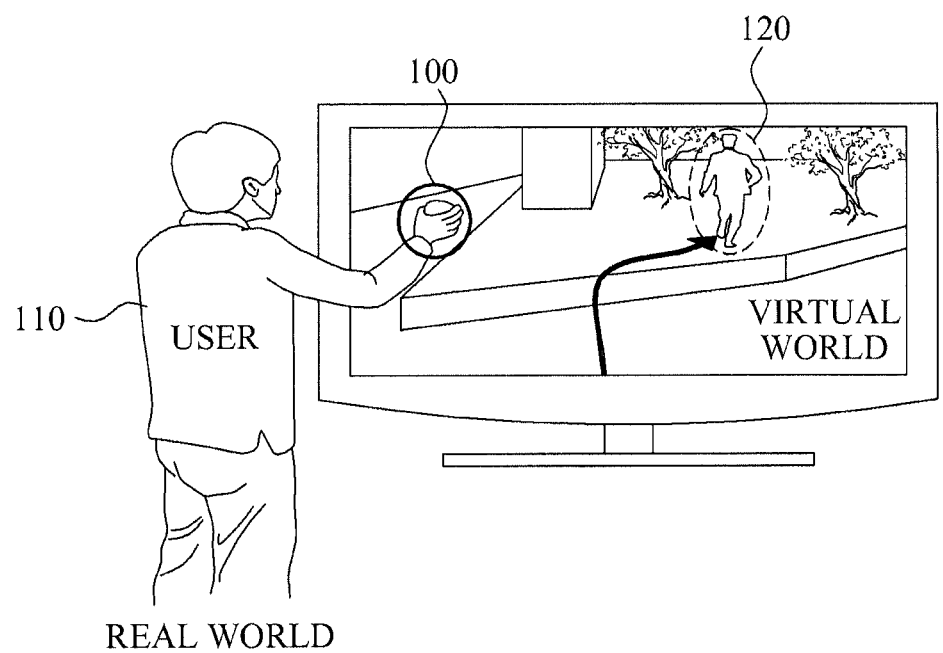
FIG. 1 is a view illustrating an operation of manipulating an object of a virtual world using a sensor according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures.

Hereinafter, the example embodiments will be described with reference to the accompanying drawings.

FIG. 1 illustrates an operation of manipulating a virtual world object 120 of a virtual world, using a sensor 100, according to example embodiments.

Referring to FIG. 1, a user 110 of a real world may manipulate the virtual world object 120 of the virtual world using the sensor 100. The user 110 may input his or her motion, state, intention, shape, and the like, through the sensor 100. The sensor 100 may transmit control information (CI) related to the motion, state, intention, shape, and the like, of the user 110, the CI included in a sensor signal, to a virtual world processing apparatus.

The virtual world may be classified into a virtual environment and a virtual world object. The virtual world object may be classified into an avatar and a virtual object.

Depending on embodiments, the user 110 of the real world may include humans, animals, plants, inanimate objects, and even environmental conditions of the user 110, such as, temperature and atmospheric pressure.

Figure 2:
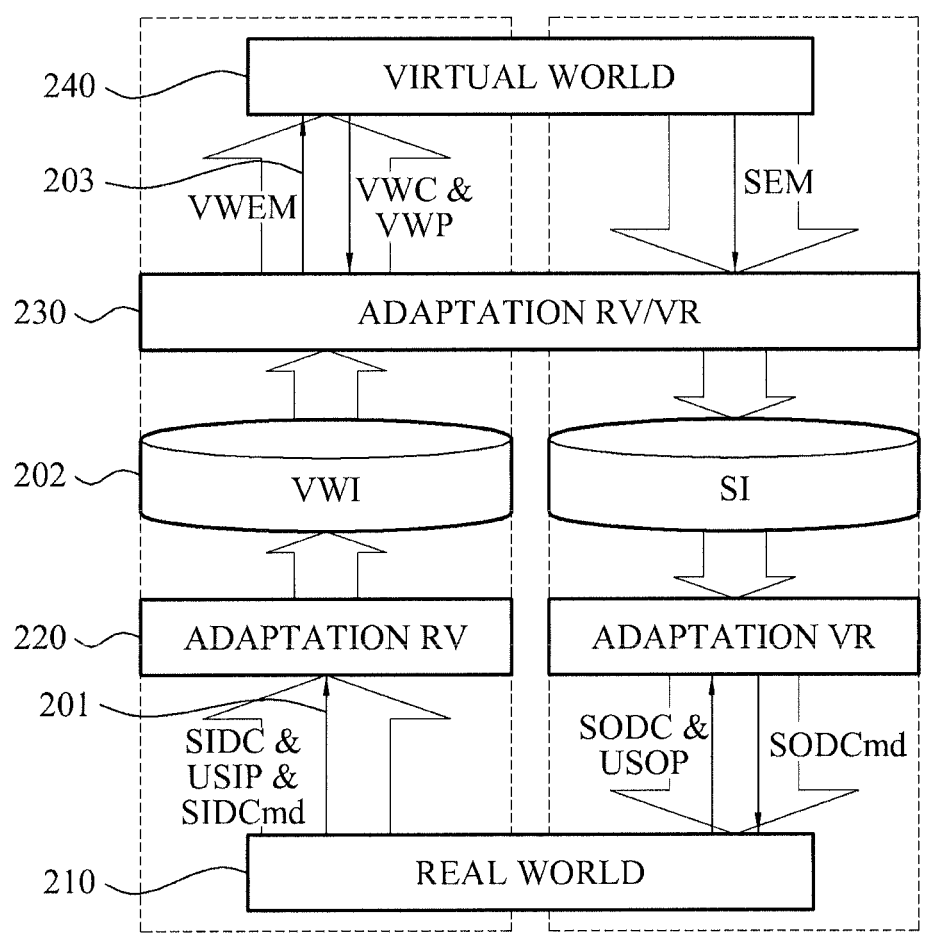
FIG. 2 is a view illustrating a system for manipulating an object of a virtual world using a sensor, according to example embodiments.

FIG. 2 illustrates a system for manipulating a virtual world using a sensor, according to example embodiments.

Referring to FIG. 2, the signal that includes CI 201, related to the motion, state, intention, shape, and the like, of a user of a real world 210, is inputted through a sensor as a real world device, and may be transmitted to a virtual world processing apparatus. Depending on embodiments, the CI 201 related to the motion, state, intention, shape, and the like, of the user may include a sensor capability, a sensor adaptation preference, and sensed information, which will be described in detail with reference to FIG. 7 through FIG. 16.

The virtual world processing apparatus may include an adaptation of the real world to the virtual world (RV) 220. The adaptation RV 220 may be implemented by an RV engine. The adaptation RV 220 may convert information of the real world 210 to information applicable to a virtual world 240, using the CI 201 related to the motion, state, intention, shape, and the like, of the user of the real world 210, the CI 201 included in the sensor signal.

Depending on embodiments, the adaptation RV 220 may convert virtual world information (VWI) 202 using the CI 201 related to the motion, state, shape, and the like of the user of the real world 210.

The VWI 202 denotes information on the virtual world 240. For example, the VWI 202 may include information on an object of the virtual world 240 or elements constituting the object.

The virtual world processing apparatus may transmit converted information 203 converted by the adaptation RV 220 to the virtual world 240 through an adaptation real world to virtual world/virtual world to real world (RV/VR) 230.

Table 1 illustrates structures shown in FIG. 2.

TABLE 1

| SIDC | Sensory input device capabilities. Another expression of sensor capability | VWI | Virtual world information |
|---|---|---|---|
| USIP | User sensory input preferences. Another expression of sensor adaptation preference | SODC | Sensory output device capabilities |
| SIDCmd | Sensory input device commands Another expression of sensed information | USOP | User sensory output preferences |
| VWC | Virtual world capabilities | SODCmd | Sensory output device commands |

TABLE 1-continued

| VWP | Virtual world preferences | SEM | Sensory effect metadata |
|---|---|---|---|
| VWEM | Virtual world effect metadata | SI | Sensory information |

Figure 3:
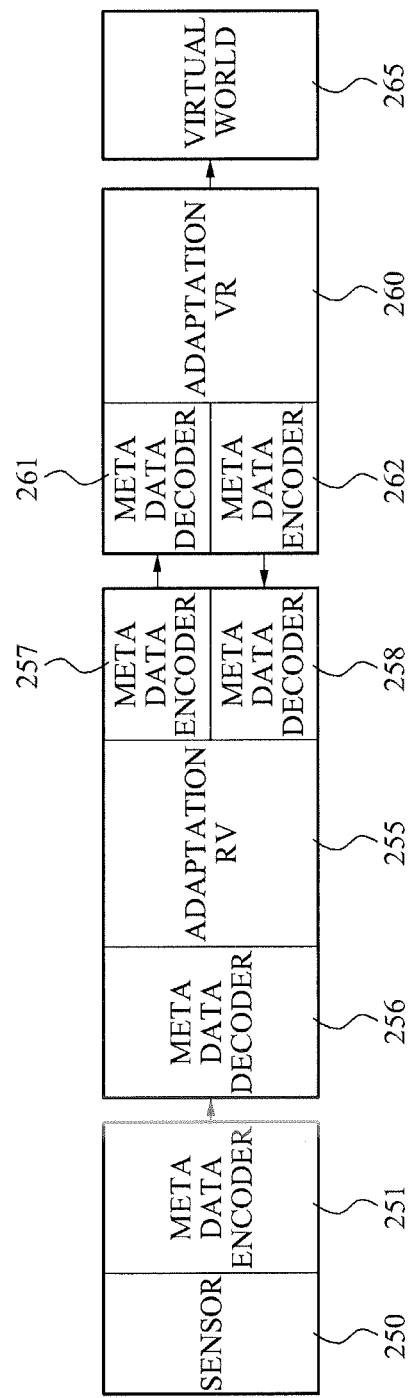
FIG. 3 is a view illustrating a system for manipulating an object of a virtual world using a sensor, according to other example embodiments.

FIG. 3 illustrates a system for manipulating an object of a virtual world 265 using a sensor 250, according to other example embodiments.

Referring to FIG. 3, the sensor 250 may collect information on a motion, state, intention, shape, and the like, of a user of a real world.

The sensor 250 may include a metadata encoder 251 configured to encode the information collected by the sensor 250 into metadata.

The metadata encoder 251 may encode the information collected by the sensor 250 to first metadata. The sensor 250 may transmit the first metadata to an adaptation RV 255.

A metadata decoder 256 included in the adaptation RV 255 may decode the first metadata received from the sensor 250. In addition, a metadata decoder 258 included in the adaptation RV 255 may decode second metadata received from an adaptation VR 260.

The second metadata may be metadata encoded from information on the virtual world 265 by a metadata encoder 257 included in the adaptation VR 260.

The adaptation RV 255 may generate information to be applied to the virtual world 265, based on information decoded from the first metadata by the metadata decoder 256 and information decoded from the second metadata by the metadata decoder 258. Here, the adaptation RV 255 may generate the information to be applied to the virtual world 265, such that the information corresponds to virtual world object characteristics and sensed information included in the second metadata.

The metadata encoder 257 may encode the information, which is generated by the adaptation RV 255 and to be applied to the virtual world 265, into third metadata. In addition, the adaptation RV 255 may transmit the third metadata to the adaptation VR 260.

A metadata decoder 271 included in the adaptation VR 260 may decode the third metadata. The adaptation VR 260 may convert attributes of the object of the virtual world 265, based on the decoded information and, in addition, apply the converted attributes to the virtual world 265.

Figure 4:
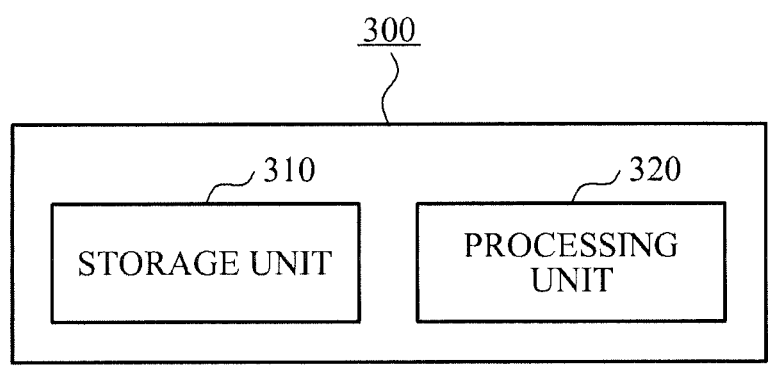
FIG. 4 is a view illustrating a structure of a virtual world processing apparatus, according to example embodiments.

FIG. 4 illustrates a structure of a virtual world processing apparatus 300, according to example embodiments.

Referring to FIG. 4, the virtual world processing apparatus 300 includes a storage unit 310 and a processing unit 320.

The storage unit 310 stores a sensor capability describing capability of a sensor.

The sensor is a device for measuring a motion, state, intention, shape, and the like, of a user of a real world. The sensor may be expressed as a sensory input device. Depending on embodiments, the sensor may be classified according to sensor types including (1) acoustic, sound, and vibration, (2) automotive and transportation, (3) chemical, (4) electric current, electric potential, magnetic, and radio, (5) environment and weather, (6) flow, (7) ionizing radiation, and subatomic particles, (8) navigation instruments, (9) position, angle, displacement, distance, speed, and acceleration, (10) optical, light, and imaging, (11) pressure, force, density, and level, (12) thermal, heat, and temperature, (13) proximity and presence, and (14) sensor technology.

Table 2 illustrates example sensors according to the sensor types. The sensors in Table 2 are suggested only as an embodiment but not limiting.

TABLE 2

| sensor type | list of sensors |
| --- | --- |
| (1) acoustic, sound, vibration | geophone<br>hydrophone<br>lace sensor, a guitar pickup<br>microphone<br>seismometer<br>accelerometer |
| (2) automotive, transportation | crank sensor<br>curb feeler<br>defect detector<br>map sensor<br>parking sensors<br>parktronic<br>radar gun<br>speedometer<br>speed sensor<br>throttle position sensor<br>variable reluctance sensor<br>wheel speed sensor |
| (3) chemical | breathalyzer<br>carbon dioxide sensor<br>carbon monoxide detector<br>catalytic bead sensor<br>chemical field-effect transistor<br>electronic nose<br>electrolyte-insulator-semiconductor sensor<br>hydrogen sensor<br>infrared point sensor<br>ion-selective electrode<br>nondispersive infrared sensor<br>microwave chemistry sensor<br>nitrogen oxide sensor<br>optode<br>oxygen sensor<br>pellistor<br>pH glass electrode<br>potentiometric sensor<br>redox electrode<br>smoke detector<br>zinc oxide nanorod sensor |
| (4) electric current, electric potential, magnetic, radio | ammeter<br>current sensor<br>galvanometer<br>hall effect sensor<br>hall probe<br>leaf electroscope<br>magnetic anomaly detector<br>magnetometer<br>metal detector<br>multimeter<br>ohmmeter<br>voltmeter<br>watt-hour meter |
| (5) environment, weather | fish counter<br>gas detector<br>hygrometer<br>pyranometer<br>pyrgeometer<br>rain gauge<br>rain sensor<br>seismometers |
| (6) flow | air flow meter<br>flow sensor<br>gas meter<br>mass flow sensor<br>water meter |
| (7) ionizing radiation, subatomic particles | bubble chamber<br>cloud chamber<br>geiger counter<br>neutron detection<br>particle detector<br>scintillation counter<br>scintillator<br>wire chamber |
| (8) navigation instruments | air speed indicator<br>altimeter<br>attitude indicator<br>fluxgate compass<br>gyroscope<br>inertial reference unit<br>magnetic compass<br>MHD sensor<br>ring laser gyroscope<br>turn coordinator<br>variometer<br>vibrating structure gyroscope<br>yaw rate sensor |
| (9) position, angle, displacement, distance, speed, acceleration | accelerometer<br>inclinometer<br>laser rangefinder<br>linear encoder<br>linear variable differential transformer (LVDT)<br>liquid capacitive inclinometers<br>odometer<br>piezoelectric accelerometer<br>position sensor<br>rotary encoder<br>rotary variable differential transformer<br>selsyn<br>tachometer |
| (10) optical, light, imaging | charge-coupled device<br>colorimeter<br>infra-red sensor<br>LED as light sensor<br>nichols radiometer<br>fiber optic sensors<br>photodiode<br>photomultiplier tubes<br>phototransistor<br>photoelectric sensor<br>photoionization detector<br>photomultiplier<br>photoresistor<br>photoswitch<br>phototube<br>proximity sensor<br>scintillometer<br>shack-Hartmann wavefront sensor |
| (11) pressure, force, density, level | anemometer<br>bhangmeter<br>barograph<br>barometer<br>hydrometer<br>Level sensor<br>Load cell<br>magnetic level gauge<br>oscillating U-tube<br>pressure sensor<br>piezoelectric sensor<br>pressure gauge<br>strain gauge<br>torque sensor<br>viscometer |
| (12) thermal, heat, temperature | bolometer<br>calorimeter<br>heat flux sensor<br>infrared thermometer<br>microbolometer<br>microwave radiometer<br>net radiometer<br>resistance temperature detector<br>resistance thermometer<br>thermistor<br>thermocouple<br>thermometer |
| (13) proximity, presence | alarm sensor<br>bedwetting alarm<br>motion detector<br>occupancy sensor<br>passive infrared sensor<br>reed switch |

TABLE 2-continued

| sensor type | list of sensors |
|---|---|
| (14) sensor technology | stud finder<br>triangulation sensor<br>touch switch<br>wired glove<br>active pixel sensor<br>machine vision<br>biochip<br>biosensor<br>capacitance probe<br>catadioptric sensor<br>carbon paste electrode<br>displacement receiver<br>electromechanical film<br>electro-optical sensor<br>image sensor<br>inductive sensor<br>intelligent sensor<br>lab-on-a-chip<br>leaf sensor<br>RADAR<br>sensor array<br>sensor node<br>soft sensor<br>staring array<br>transducer<br>ultrasonic sensor<br>video sensor |

For example, the microphone belonging to a sensor type (1) acoustic, sound, and vibration may collect voice of the user of the real world and ambient sounds of the user. The speed sensor belonging to the sensor type (2) automotive and transportation may measure speed of the user of the real world and speed of an object, such as, a vehicle of the real world. The oxygen sensor belonging to the sensor type (3) chemical may measure an oxygen ratio in ambient air around the user of the real world and an oxygen ratio in liquid around the user of the real world. The metal detector belonging to the sensor type (4) electric current, electric potential, magnetic, and radio may detect metallic substances present in or around the user of the real world. The rain sensor belonging to the sensor type (5) environment and weather may detect whether it is raining in the real world. The flow sensor belonging to the sensor type (6) flow may measure a ratio of a fluid flow of the real world. The scintillator belonging to the sensor type (7) ionizing radiation and subatomic particles may measure a ratio or radiation present in or around the user of the real world. The variometer belonging to the sensor type (8) navigation instruments may measure a vertical movement speed of or around the user of the real world. The odometer belonging to the sensor type (9) position, angle, displacement, distance, speed, and acceleration may measure a traveling distance of an object of the real world, such as a vehicle. The phototransistor belonging to the sensor type (10) optical, light, and imaging may measure light of the real world. The barometer belonging to the sensor type (11) pressure, force, density, and level may measure an atmospheric pressure of the real world. The bolometer belonging to the sensor type (12) thermal, heat, and temperature may measure radiation rays of the real world. The motion detector belonging to the sensor type (13) proximity and presence may measure a motion of the user of the real world. The biosensor belonging to the sensor type (14) may measure biological characteristics of the user of the real world.

Figure 5:
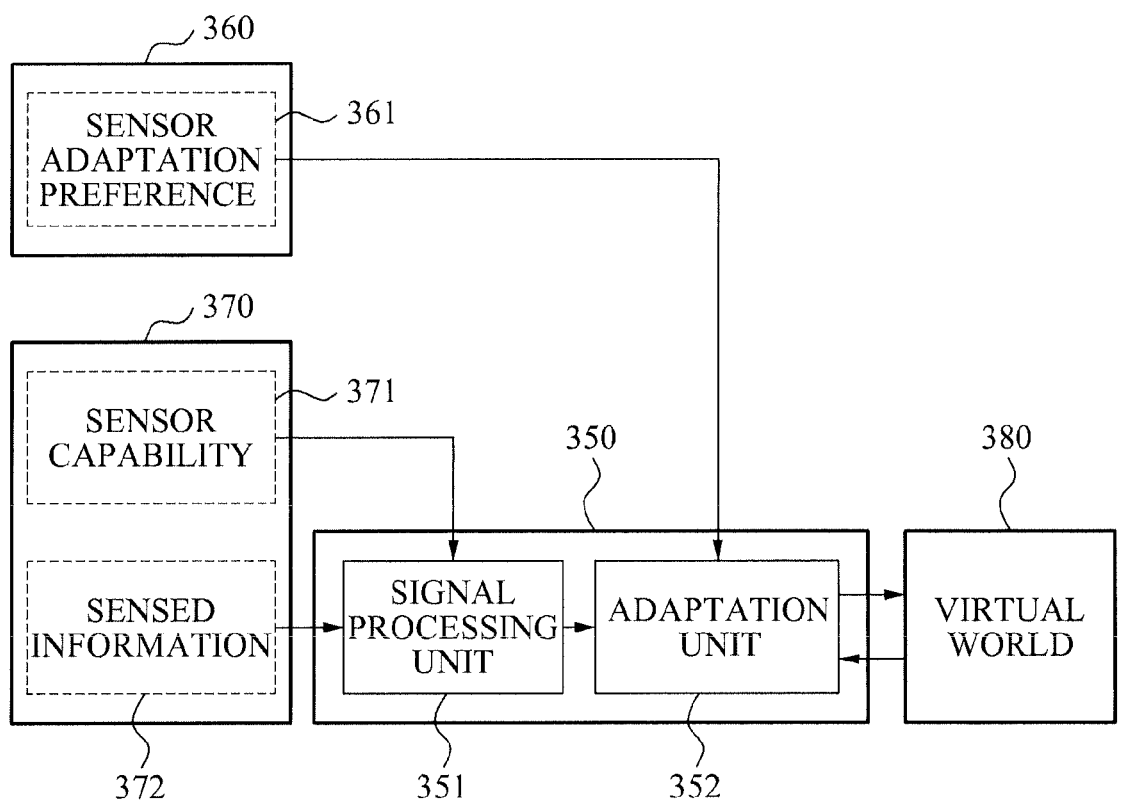
FIG. 5 is a view illustrating a structure of a virtual world processing apparatus, according to other example embodiments.

FIG. 5 illustrates a structure of a virtual world processing apparatus, according to other example embodiments.

Referring to FIG. 5, an input device 360 according to the present embodiments may be input with a sensor adaptation preference 361 by a user of a real world. Depending on embodiments, the input device 360 may be modularized and inserted in a sensor 370 or a virtual world processing apparatus 350. The sensor adaptation preference 361 will be described in further detail with reference to FIGS. 10 to 12.

The sensor 370 may transmit a sensor capability 371 and sensed information 372 to the virtual world processing apparatus 350. The sensor capability 371 and the sensed information 372 will be described in further detail with reference to FIGS. 7 to 9 and 13.

The virtual world processing apparatus 350 may include a signal processing unit 351 and an adaptation unit 352.

The signal processing unit 351 may receive the sensor capability 371 and the sensed information 372, and perform signal-processing with respect to the sensor capability 371 and the sensed information 372. Depending on embodiments, the signal processing unit 351 may filter and validate the sensor capability 371 and the sensed information 372.

The adaptation unit 352 may receive the sensor adaptation preference 361 from the input device 360. In addition, based on the received sensor adaptation preference 361, the adaptation unit 352 may perform adaptation with respect to the information signal-processed by the signal processing unit 351 so that the information is applied to a virtual world 380. In addition, the virtual world processing apparatus 350 may apply the information having undergone the adaptation by the adaptation unit 352 to the virtual world 380.

The sensor capability 371 denotes information on capability of a sensor.

A sensor capability base type denotes a base type of the sensor capability. Depending on embodiments, the sensor capability base type may be a base abstract type of the metadata related to a sensor capability commonly applied to all types of sensors, as part of metadata types related to the sensor capability.

Hereinafter, the sensor capability 371 and the sensor capability base type will be described in detail with reference to FIGS. 7 to 9.

Figure 7:
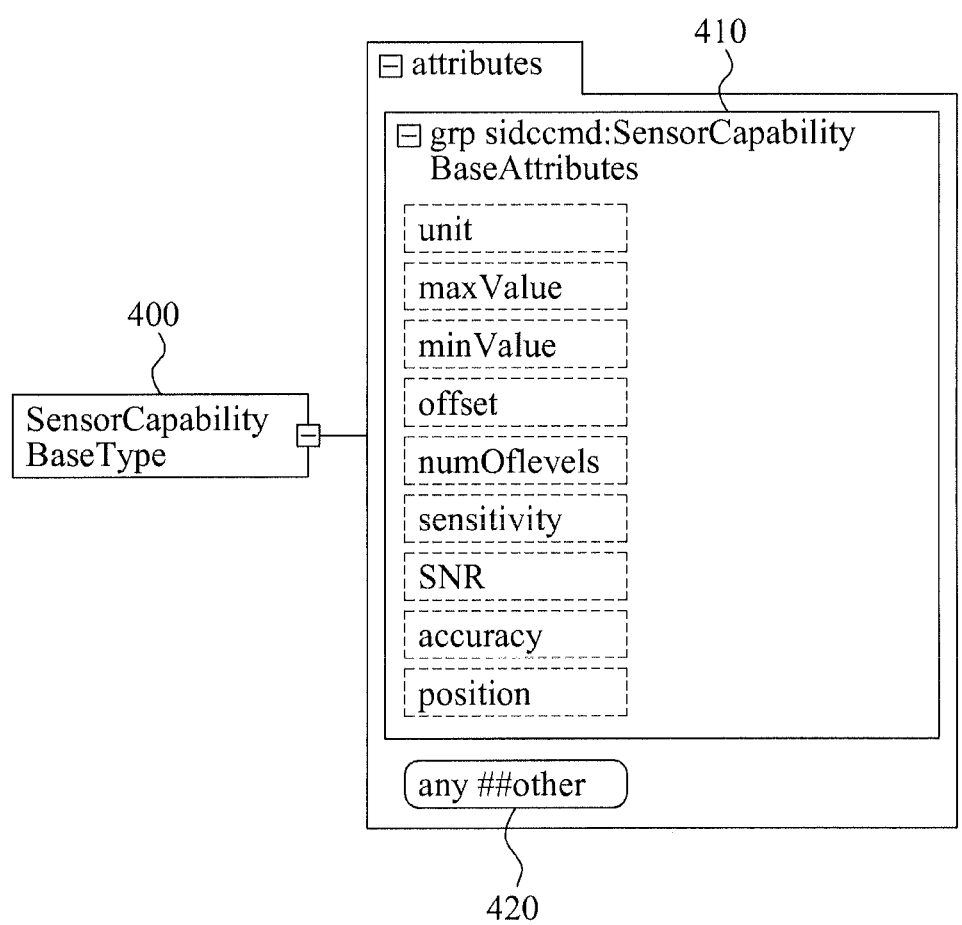
FIG. 7 is a view illustrating a sensor capability base type, according to example embodiments.

FIG. 7 illustrates a sensor capability base type 400, according to example embodiments.

Referring to FIG. 7, the sensor capability base 400 may include sensor capability base attributes 410 and any attributes 420.

The sensor capability base attributes 410 denote a group of sensor capabilities basically included in the sensor capability base type 400.

The any attributes 420 denote a group of additional sensor capabilities of a sensor. The any attributes 420 may be unique additional sensor capabilities, which are applicable to an arbitrary sensor. The any attributes 420 may allow scalability for inclusion of attributes other than the base attributes.

Figure 8:
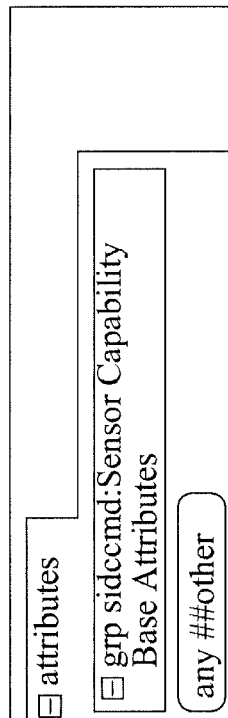
FIG. 8 is a view illustrating syntax of a sensor capability base type, according to example embodiments.

FIG. 8 illustrates syntax 500 of a sensor capability base type according to example embodiments.

Referring to FIG. 8, the syntax 500 of the sensor capability base type may include a diagram 510, attributes 520, and a source 530.

The diagram 510 may include a diagram of the sensor capability base type.

The attributes 520 may include sensor capability base attributes and any attributes.

The source 530 may include a program representing the sensor capability base type using an extensible markup language (XML). However, the source 530 shown in FIG. 8 is suggested by way of example but not limiting.

FIG. 9 illustrates syntax 600 of sensor capability base attributes, according to example embodiments.

Referring to FIG. 9, the syntax 600 of the sensor capability base attributes may include a diagram 610, attributes 620, and a source 630.

The diagram 610 may include a diagram of the sensor capability base attributes.

The attributes 620 may include a unit 601, a maximum value 602, a minimum value 603, an offset 604, a number of levels 605, a sensitivity 606, a signal to noise ratio (SNR) 607, and an accuracy 608.

The unit 601 is a unit of values measured by a sensor. Depending on embodiments, for example, when the sensor is a thermometer, the unit 601 may be Celsius (° C.) and Fahrenheit (° F.). When the sensor is a speed sensor, the unit 601 may be kilometers per hour (km/h) and meters per second (m/s).

The maximum value 602 and the minimum value 603 denote a maximum value and a minimum value measurable by the sensor, respectively. Depending on embodiments, for example, when the sensor is a thermometer, the maximum value 602 may be 50° C. and the minimum value 603 may be 0° C. Even in the same type of sensor, for example, the thermometer, the maximum value 602 and the minimum value 603 may be varied, according to use and function of the sensor.

The offset 604 denotes a value added to a value measured by the sensor to obtain an absolute value. Depending on embodiments, for example, presuming that the sensor is a speed sensor and a user or an object of a real world stays still, when a value other than zero is measured as speed, the sensor may determine the offset 604 to a value making the speed zero. For example, when −1 km/h is measured as speed of a vehicle of the real world, the offset 604 may be 1 km/h.

The number of levels 605 denotes a number of values measurable by the sensor. That is, the number of levels 605 represents the number of values between the maximum value and the minimum value measured by the sensor. Depending on embodiments, for example, presuming that the sensor is a thermometer and the maximum value and the minimum value are 50° C. and 0° C., respectively, when the number of levels 605 is 5, the sensor may measure five values, that is, 10° C., 20° C., 30° C., 40° C., and 50° C. Even when temperature of the real world is 27° C., not only when 20° C., the temperature may be measured as 20° C. through round-down. Alternative, in this case, the temperature may be measured as 30° C. through roundup.

The sensitivity 606 denotes a minimum input value required for the sensor to measure an output value. That is, the sensitivity 606 may denote a minimum input signal value for generation of the output signal. Depending on embodiments, for example, when the sensor is a thermometer and the sensitivity 606 is 1° C., the sensor may not measure a temperature change less than 1° C. but measure only the temperature change of at least 1° C.

The SNR 607 denotes a relative degree of a signal measured by the sensor with respect to a noise. Depending on embodiments, presuming that the sensor is a microphone to measure and a vocal sound of the user of the real world is to be measured, when an ambient noise is large, the SNR 607 of the sensor may be relatively small.

The accuracy 608 denotes an error of the sensor. That is, the accuracy 608 denotes a degree of closeness of a measured quantity with respect to an actual value. Depending on embodiments, when the sensor is a microphone, the accuracy 608 may be a measurement error caused by variation of a propagation speed of a sound according to temperature, humidity, and the like. Alternatively, the accuracy 608 may be determined through a statistical error of the values already measured by the sensor.

Depending on embodiments, the attributes 620 may further include a position. The position denotes a position of the sensor. When the sensor is a thermometer, the position of the sensor may be an armpit of the user of the real world. The position may include longitude and latitude, and height and direction from a ground surface.

The unit 601, the maximum value 602, the minimum value 603, the offset 604, the number of levels 605, the sensitivity 606, the SNR 607, the accuracy 608, and the position, as the sensor capability base attributes, may be rearranged as shown in Table 3.

TABLE 3

| Name | Definition |
| --- | --- |
| Unit 601 | The unit of value |
| maxValue 602 | The maximum value that the input device (sensor) can provide. The terms will be different according to the individual device type. |
| minValue 603 | The minimum value that the input device (sensor) can provide. The terms will be different according to the individual device type. |
| Offset 604 | The number of value locations added to a base value in order to get to a specific absolute value. |
| numOflevels 605 | The number of value levels that the device can provide in between maximum and minimum value. |
| Sensitivity 606 | The minimum magnitude of input signal required to produce a specified output signal. |
| SNR 607 | The ratio of a signal power to the noise power corrupting the signal |
| Accuracy 608 | The degree of closeness of a measured quantity to its actual value |
| Position | The position of the device from the user's perspective according to the x-, y-, and z-axis |

The source 630 may include a program representing the sensor capability base attributes using the XML.

A reference numeral 631 of the source 630 defines the maximum value 602 using the XML. According to the reference numeral 631, the maximum value 602 has "float" type data and is optionally used.

A reference numeral 632 of the source 630 defines the minimum value 603 using the XML. According to the reference numeral 632, the minimum value 603 has "float" type data and is optionally used.

A reference numeral 633 of the source 630 defines the number of levels 605 using the XML. According to the reference numeral 633, the number of levels 605 has "on NegativeInteger" type data and is optionally used.

However, the source 630 shown in FIG. 9 is not limiting but only example embodiments.

Referring to FIG. 4 again, the processing unit 320 may determine a first value received from the sensor based on the sensor capability, and transmit a second value corresponding to the first value to the virtual world.

Depending on embodiments, the processing unit 320 may transmit the second value to the virtual world when the first value received from the sensor is less than or equal to a maximum value measurable by the sensor and greater than or equal to a minimum value measurable by the sensor.

Depending on embodiments, when the first value received from the sensor is greater than the maximum value, the processing unit 320 may consider the first value as the maximum value and transmit the second value to the virtual world. In addition, when the first value is less than the minimum value, the processing unit 320 may consider the first value as the minimum value and transmit the second value to the virtual world.

The virtual world processing apparatus 300 may further include a second storage unit (not shown) configured to store a sensor adaptation preference for manipulation of the first value received from the sensor. The processing unit 320 may generate a third value from the first value based on the sensor capability, and generate the second value from the third value based on the sensor adaptation preference.

Depending on embodiments, information on the motion, state, intention, shape, and the like of the user of the real world, which are measured through the sensor, may be directly reflected to the virtual world.

Figure 6:
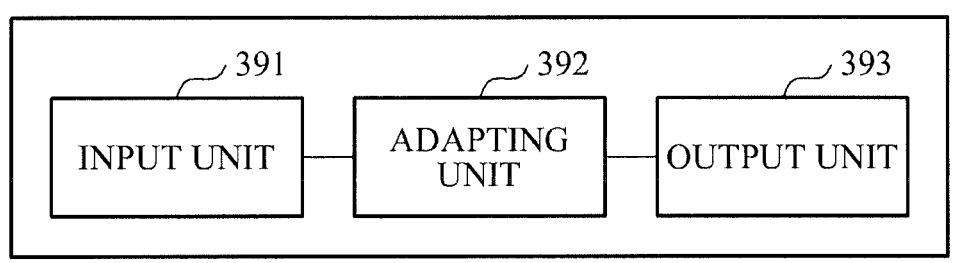
FIG. 6 is a view illustrating a structure of a virtual world processing apparatus, according to still other example embodiments.

FIG. 6 illustrates a structure of a virtual world processing apparatus 390 according to still other example embodiments.

Referring to FIG. 6, the virtual world processing apparatus 390 is configured to enable interoperability between a virtual world and a real world or interoperability between virtual worlds. The virtual world processing apparatus 390 may include an input unit 391 and an adapting unit 392.

The input unit 391 may be input with sensed information collected by a sensor from the real world.

The input unit 391 may be further input with a sensor adaptation preference for manipulation of the sensed information. The sensor adaptation preference will be described in further detail with reference to FIGS. 10 to 12.

The adapting unit 392 may adapt the sensed information input to the input unit 391, based on the sensor capability.

For example, when a speed sensor sensed speed of the user of the real world and collected the sensed information of 30 m/s, the input unit 391 may be input with the sensed information of 30 m/s. Here, when a maximum value of the sensor capability related to the speed sensor is 20 m/s, the adapting unit 392 may adapt the sensed information of 30 m/s to 20 m/s. In addition, the virtual world processing apparatus may apply the adapted sensed information of 20 m/s to the virtual world.

Depending on embodiments, the sensor capability may be input and stored in advance in the virtual world processing apparatus. The sensor capability may be input through the input unit 391.

The adapting unit 392 may adapt the sensed information based on the sensor adaptation preference.

The virtual world processing apparatus 390 may further include an output unit 393.

The output unit 393 may output the sensed information to control the virtual world. Depending on embodiments, the output unit 393 may output the sensed information adapted based on the sensor capability. Furthermore, the output unit 393 may output the sensed information adapted based on the sensor capability and the sensor adaptation preference.

An output unit 393 according to other example embodiments may output the sensed information to control virtual world object information which denotes information on an object implemented in the virtual world. Depending on embodiments, the output unit 393 may output the sensed information adapted based on the sensor capability. Furthermore, the output unit 393 may output the sensed information adapted based on the sensor capability and the sensor adaptation preference.

Hereinafter, the sensor capability will be described in relation to specific embodiments of the sensor. Although not limited to those embodiments, the sensor may include a position sensor, an orientation sensor, an acceleration sensor, a light sensor, a sound sensor, a temperature sensor, a humidity sensor, a length sensor, a motion sensor, an intelligent camera sensor, an ambient noise sensor, an atmospheric sensor, a velocity sensor, an angular velocity sensor, an angular acceleration sensor, a force sensor, a torque sensor, and a pressure sensor.

Source 1 denotes a sensor capability related to the position sensor using the XML. However, a program source shown in Source 1 is only an example embodiment and does not limit the present disclosure.

[Source 1]

```
<!-- ################################################## -->
<!-- Position Sensor capability type                  -->
<!-- ################################################## -->
<complexType name="PositionSensorCapabilityType">
<complexContent>
<extension base="cid:SensorCapabilityBaseType">
<sequence>
<element name="range" type="cid:RangeType"/>
</sequence>
</extension>
</complexContent>
</complexType>
<complexType name="RangeType">
<sequence>
<element name="XminValue" type="float"/>
<element name="XmaxValue" type="float"/>
<element name="YminValue" type="float"/>
<element name="YmaxValue" type="float"/>
<element name="ZminValue" type="float"/>
<element name="ZmaxValue" type="float"/>
</sequence>
</complexType>
```

A position sensor capability type is a tool for describing the sensor capability related to the position sensor.

The position sensor capability type may include sensor capability base attributes related to the position sensor.

The sensor capability base attributes related to the position sensor may include a range, a range type, an x maximum value, an x minimum value, a y maximum value, a y minimum value, a z maximum value, and a z minimum value.

The range denotes a range measurable by the position sensor. For example, the measurable range of the position sensor may be expressed using the range type and a global coordinate system.

An origin of the global coordinate may be located at a top left corner of a screen. A right handed coordinate system may be applied as the global coordinate. In the global coordinate, a positive direction of an x-axis may be a direction to a top right corner of the screen, a positive direction of a y-axis may be a gravity direction, that is, a bottomward direction of the screen, and a positive direction of a z-axis may be a direction opposite to the user, that is, a direction into the screen.

The range type denotes a range of the global coordinate system according to the x-axis, the y-axis, and the z-axis.

The x maximum value denotes a maximum value on the x-axis, measurable by the position sensor using a unit of a position coordinate, for example, a meter.

The x minimum value denotes a minimum value on the x-axis, measurable by the position sensor using a unit of a position coordinate, for example, a meter.

The y maximum value denotes a maximum value on the y-axis, measurable by the position sensor using a unit of a position coordinate, for example, a meter.

The y minimum value denotes a minimum value on the y-axis, measurable by the position sensor using a unit of a position coordinate, for example, a meter.

The z maximum value denotes a maximum value on the z-axis, measurable by the position sensor using a unit of a position coordinate, for example, a meter.

The z minimum value denotes a minimum value on the z-axis, measurable by the position sensor using a unit of a position coordinate, for example, a meter.

Source 2 denotes a sensor capability related to an orientation sensor using the XML. However, a program source shown in Source 2 is only an example embodiment and does not limit the present disclosure.

[Source 2]

```
<!-- ################################################## -->
<!-- Orientation Sensor capability type           -->
<!-- ################################################## -->
<complexType name="OrientationSensorCapabilityType">
<complexContent>
<extension base="cid:SensorCapabilityBaseType">
<sequence>
<element name="orientationrange" type="cid:OrientationRangeType"/>
</sequence>
</extension>
</complexContent>
</complexType>
<complexType name="OrientationRangeType">
<sequence>
<element name="XMinRotation" type="float"/>
<element name="XMaxRotation" type="float"/>
<element name="YMinRotation" type="float"/>
<element name="YMaxRotation" type="float"/>
<element name="ZMinRotation" type="float"/>
<element name="ZMaxRotation" type="float"/>
</sequence>
</complexType>
```

An orientation sensor capability type is a tool for describing the sensor capability related to the orientation sensor.

The orientation sensor capability type may include sensor capability base attributes related to the orientation sensor.

The sensor capability base attributes related to the orientation sensor may include an orientation range, an orientation range type, an x maximum value, an x minimum value, a y maximum value, a y minimum value, a z maximum value, and a z minimum value.

The range denotes a range measurable by the orientation sensor. For example, the measurable range of the orientation sensor may be expressed using the orientation range type and the global coordinate system.

The orientation range type denotes an orientation range of the global coordinate system, according to the x-axis, the y-axis, and the z-axis.

The x maximum value denotes a maximum value on the x-axis, measurable by the orientation sensor using a unit of an orientation coordinate, for example, a radian.

Similarly, the x minimum value denotes a minimum value on the x-axis, measurable by the orientation sensor using a unit of an orientation coordinate, for example, a radian.

The y maximum value denotes a maximum value on the y-axis, measurable by the orientation sensor using a unit of an orientation coordinate, for example, a radian.

The y minimum value denotes a minimum value on the y-axis, measurable by the orientation sensor using a unit of an orientation coordinate, for example, a radian.

The z maximum value denotes a maximum value on the z-axis, measurable by the orientation sensor using a unit of an orientation coordinate, for example, a radian.

The z minimum value denotes a minimum value on the z-axis, measurable by the orientation sensor using a unit of an orientation coordinate, for example, a radian.

Source 3 denotes a sensor capability related to an acceleration sensor using the XML. However, a program source shown in Source 3 is only an example embodiment and does not limit the present disclosure.

[Source 3]

```
<!-- ################################################## -->
<!-- Acceleration Sensor capability type           -->
<!-- ################################################## -->
<complexType name="AccelerationSensorCapabilityType">
<complexContent>
<extension base="cid:SensorCapabilityBaseType">
</extension>
</complexContent>
</complexType>
```

An acceleration sensor capability type is a tool for describing the sensor capability related to the acceleration sensor.

The acceleration sensor capability type may include sensor capability base attributes related to the acceleration sensor.

The sensor capability base attributes related to the acceleration sensor may include a maximum value and a minimum value.

The maximum value denotes a maximum value measurable by the acceleration sensor using a unit of acceleration, for example, $m/s^2$.

Similarly, the minimum value denotes a minimum value measurable by the acceleration sensor using a unit of acceleration, for example, $m/s^2$.

Source 4 denotes a sensor capability related to a light sensor using the XML. However, a program source shown in Source 4 is only an example embodiment and does not limit the present disclosure.

[Source 4]

```
<!-- ################################################## -->
<!-- Light Sensor capability type           -->
<!-- ################################################## -->
<complexType name="LightSensorCapabilityType">
<complexContent>
<extension base="cid:SensorCapabilityBaseType">
<sequence>
<element name="color" type="cid:colorType" minOccurs="0" maxOccurs="unbounded"/>
</sequence>
<attribute name="location" type="mpeg7:termReferenceType" use="optional"/>
</extension>
</complexContent>
</complexType>
```

A light sensor capability type is a tool for describing the sensor capability related to the light sensor.

The light sensor capability type may include sensor capability base attributes related to the light sensor.

The sensor capability base attributes related to the light sensor may include a maximum value, a minimum value, a color, and a location.

The maximum value denotes a maximum value measurable by the light sensor using a unit of light intensity, for example, LUX.

Likewise, the minimum value denotes a minimum value measurable by the light sensor using a unit of light intensity, for example, LUX.

The color denotes a color that may be provided by the light sensor. For example, the color may be an RGB color value.

The location denotes a location of the light sensor. For example, the location of the light sensor may be expressed using the global coordinate according to the x-axis, the y-axis, and the z-axis.

Source 5 denotes a sensor capability related to a sound sensor using the XML. However, a program source shown in Source 5 is only an example embodiment and does not limit the present disclosure.

[Source 5]

```
<!--######################## -->
<!-- Sound Sensor capability type -->
<!--######################## -->
<complexType name="SoundSensorCapabilityType">
  <complexContent>
    <extension base="sidc:CapabilityBaseType"/>
  </complexContent>
</complexType>
```

A sound sensor capability type is a tool for describing the sensor capability related to the sound sensor.

The sound sensor capability type may include sensor capability base attributes related to the sound sensor.

The sensor capability base attributes related to the sound sensor may include a maximum value and a minimum value.

The maximum value denotes a maximum value measurable by the sound sensor using a unit of sound intensity, for example, a decibel (dB).

Similarly, the minimum value denotes a minimum value measurable by the sound sensor using a unit of sound intensity, for example, a dB.

Source 6 denotes a sensor capability related to a temperature sensor using the XML. However, a program source shown in Source 6 is only an example embodiment and does not limit the present disclosure.

[Source 6]

```
<!-- ################################################## -->
<!-- Temperature Sensor capability type            -->
<!-- ################################################## -->
<complexType name="TemperatureSensorCapabilityType">
<complexContent>
<extension base="cid:SensorCapabilityBaseType">
<attribute name="location" type="mpeg7:termReferenceType" use="optional"/>
   </extension>
</complexContent>
</complexType>
```

A temperature sensor capability type is a tool for describing the sensor capability related to the temperature sensor.

The temperature sensor capability type may include sensor capability base attributes related to the temperature sensor.

The sensor capability base attributes related to the temperature sensor may include a maximum value, a minimum value, and a location.

The maximum value denotes a maximum value measurable by the temperature sensor using a unit of temperature, for example, ° C. and ° F.

The minimum value denotes a minimum value measurable by the temperature sensor using a unit of temperature, for example, ° C. and ° F.

The location denotes a location of the temperature sensor. For example, the location of the temperature sensor may be expressed using the global coordinate according to the x-axis, the y-axis, and the z-axis.

Source 7 denotes a sensor capability related to a humidity sensor using the XML. However, a program source shown in Source 7 is only an example embodiment and does not limit the present disclosure.

[Source 7]

```
<!-- ################################################## -->
<!-- Humidity Sensor capability type            -->
<!-- ################################################## -->
<complexType name="HumiditySensorCapabilityType">
<complexContent>
<extension base="cid:SensorCapabilityBaseType">
<attribute name="location" type="mpeg7:termReferenceType" use="optional"/>
   </extension>
</complexContent>
</complexType>
```

A humidity sensor capability type is a tool for describing the sensor capability related to the humidity sensor.

The humidity sensor capability type may include sensor capability base attributes related to the humidity sensor.

The humidity capability base attributes related to the humidity sensor may include a maximum value, a minimum value, and a location.

The maximum value denotes a maximum value measurable by the humidity sensor using a unit of humidity, for example, percent (%).

The minimum value denotes a minimum value measurable by the humidity sensor using a unit of humidity, for example, %.

The location denotes a location of the humidity sensor. For example, the location of the humidity sensor may be expressed using the global coordinate according to the x-axis, the y-axis, and the z-axis.

Source 8 denotes a sensor capability related to a length sensor using the XML. However, a program source shown in Source 8 is only an example embodiment and does not limit the present disclosure.

[Source 8]

```
<!-- ################################################## -->
<!-- Length Sensor capability type            -->
<!-- ################################################## -->
<complexType name="LengthSensorCapabilityType">
<complexContent>
<extension base="cid:SensorCapabilityBaseType">
<attribute name="location" type="mpeg7:termReferenceType" use="optional"/>
   </extension>
</complexContent>
</complexType>
```

A length sensor capability type is a tool for describing the sensor capability related to the length sensor.

The length sensor capability type may include sensor capability base attributes related to the length sensor.

The length capability base attributes related to the length sensor may include a maximum value, a minimum value, and a location.

The maximum value denotes a maximum value measurable by the length sensor using a unit of length, for example, a meter.

Similarly, the minimum value denotes a minimum value measurable by the length sensor using a unit of length, for example, a meter.

The location denotes a location of the length sensor. For example, the location of the length sensor may be expressed using the global coordinate according to the x-axis, the y-axis, and the z-axis.

Source 9 denotes a sensor capability related to a motion sensor using the XML. However, a program source shown in Source 9 is only an example embodiment and does not limit the present disclosure.

[Source 9]

```
<!-- ################################################ -->
<!-- Motion Sensor capability type               -->
<!-- ################################################ -->
<complexType name="MotionSensorCapabilityType">
    <sequence>
        <element name="positioncapability"
type="cid:PositionSensorCapabilityType" minOccurs="0"/>
        <element name="orientationcapability"
type="cid:OrientationSensorCapabilityType" minOccurs="0"/>
        <element name="velocitycapability"
type="cid:VelocitySensorCapabilityType" minOccurs="0"/>
        <element name="angularvelocitycapability"
type="cid:AngularVelocitySensorCapabilityType" minOccurs="0"/>
        <element name="accelerationrange"
type="cid:AccelerationSensorCapabilityType" minOccurs="0"/>
        <element name="angularaccelerationcapability"
type="cid:AngularAccelerationSensorCapabilityType" minOccurs="0"/>
    </sequence>
</complexType>
```

A motion sensor capability type is a tool for describing the sensor capability related to the motion sensor.

The motion sensor may be an integrated sensor of a plurality of sensors. For example, the motion sensor may integrally include a position sensor, a velocity sensor, an acceleration sensor, an orientation sensor, an angular velocity sensor, and an angular acceleration sensor.

The motion sensor capability type may include sensor capability base attributes related to the motion sensor.

The sensor capability base attributes related to the motion sensor may include a position capability, a velocity capability, an acceleration capability, an orientation capability, an angular velocity capability, and an angular acceleration capability.

The position capability denotes capability with respect to the position.

The velocity capability denotes capability with respect to the velocity.

The acceleration capability denotes capability with respect to the acceleration.

The orientation capability denotes capability with respect to the orientation.

The angular velocity capability denotes capability with respect to the angular velocity.

The angular acceleration capability denotes capability with respect to the angular acceleration.

For example, Source 10 denotes a sensor capability related to an intelligent camera sensor using the XML. However, a program source shown in Source 10 is only an example embodiment and does not limit the present disclosure.

[Source 10]

```
<!-- ################################################ -->
<!-- Intelligent Camera CapabilityType           -->
<!-- ################################################ -->
<complexType name="IntelligentCameraCapabilityType">
```

[Source 10]
-continued

```
<complexContent>
    <extension base="cid:SensorCapabilityBaseType">
        <sequence>
            <element name="FeatureTrackingStatus"
type="boolean" minOccurs="0"/>
            <element name="FacialExpressionTrackingStatus"
type="boolean" minOccurs="0"/>
            <element name="GestureTrackingStatus"
type="boolean" minOccurs="0"/>            <element
name="maxBodyFeaturePoint" type="float" minOccurs="0"/>
            <element name="maxFaceFeaturePoint" type="float"
minOccurs="0"/>
            <element name="TrackedFeature"
type="cid:FeatureType"/>
            <element name="TrackedFacialFeaturePoints"
type="cid:FacialFeatureMask"/>
            <element name="TrackedBodyFeaturePoints"
type="cid:BodyFeatureMask"/>
        </sequence>
    </extension>
</complexContent>
</complexType>
<complexType name="FeatureType">
    <sequence>
        <element name="Face" type="boolean"/>
        <element name="Body" type="boolean"/>
        <element name="Both" type="boolean"/>
    </sequence>
</complexType>
<complexType name="FacialFeatureMask">
    <sequence>
        <element name="FaceFeaturePoint" type="boolean"
minOccurs="60" maxOccurs="200"/>
    </sequence>
</complexType>
<complexType name="BodyFeatureMask">
    <sequence>
        <element name="BodyFeaturePoint" type="boolean"
minOccurs="60" maxOccurs="200"/>
    </sequence>
</complexType>
```

An intelligent camera sensor capability type is a tool for describing the sensor capability related to the intelligent camera sensor.

The intelligent camera sensor capability type may include sensor capability base attributes related to the intelligent camera sensor.

The sensor capability base attributes related to the intelligent camera sensor may include a feature tracking status, an expression tracking status, a body movement tracking status, a maximum body feature point, a maximum face feature point, a tracked feature, tracked facial feature points, tracked body feature points, a feature type, a facial feature mask, and a body feature mask.

The feature tracking status denotes information on whether an intelligent camera is capable of tracking features.

The expression tracking status denotes information on whether the intelligent camera is capable of extracting animation related to a facial expression.

The body movement tracking status denotes information on whether the intelligent camera is capable of extracting animation related to a body.

The maximum body feature point denotes a maximum value of a body feature that can be tracked by the intelligent camera sensor.

The maximum face feature point denotes a maximum value of a face feature that can be tracked by the intelligent camera sensor.

The tracked feature denotes information on whether tracking of the body feature and the face feature is possible.

The tracked facial feature points denote information on whether the respective face features are activated or based on the facial feature mask.

The tracked body feature points denote information on whether the respective body features are activated or based on the body feature mask.

The feature type denotes a list of feature types. For example, the feature type may include a face, a body, and both face and body.

The facial feature mask denotes a list of facial features.

The body feature mask denotes a list of body features.

Source 11 denotes a sensor capability related to an ambient noise sensor using the XML. However, a program source shown in Source 11 is only an example embodiment and does not limit the present disclosure.

[Source 11]

```
<!-- ################################################# -->
<!-- Ambient noise Sensor capability type         -->
<!-- ################################################# -->
<complexType name="AmbientNoiseSensorCapabilityType">
<complexContent>
<extension base="cid:SensorCapabilityBaseType">
<attribute name="location" type="mpeg7:termReferenceType"
use="optional"/>
   </extension>
</complexContent>
</complexType>
```

An ambient noise sensor capability type is a tool for describing the sensor capability related to the ambient noise sensor.

The ambient noise sensor capability type may include sensor capability base attributes related to the ambient noise sensor.

The sensor capability base attributes related to the ambient noise sensor may include a maximum value, a minimum value, and a location.

The maximum value denotes a maximum value measurable by the ambient noise sensor. For example, a unit for the ambient noise sensor may be dB.

The minimum value denotes a minimum value measurable by the ambient noise sensor. For example, a unit for the ambient noise sensor may be dB.

The location denotes a location of the ambient noise sensor. For example, the location of the ambient noise sensor may be expressed using the global coordinate according to the x-axis, the y-axis, and the z-axis.

Source 12 denotes a sensor capability related to an atmospheric pressure sensor using the XML. However, a program source shown in Source 12 is only an example embodiment and does not limit the present disclosure.

[Source 12]

```
<!-- ################################################# -->
<!-- Atmospheric Pressure Sensor capability type  -->
<!-- ################################################# -->
<complexType name="AtmosphericPressureSensorCapabilityType">
<complexContent>
<extension base="cid:SensorCapabilityBaseType">
<attribute name="location" type="mpeg7:termReferenceType"
use="optional"/>
   </extension>
</complexContent>
</complexType>
```

An atmospheric pressure sensor capability type is a tool for describing the sensor capability related to the atmospheric pressure sensor.

The atmospheric pressure sensor capability type may include sensor capability base attributes related to the atmospheric pressure sensor.

The atmospheric pressure capability base attributes related to the atmospheric pressure sensor may include a maximum value, a minimum value, and a location.

The maximum value denotes a maximum value measurable by the atmospheric pressure sensor using a unit of atmospheric pressure, for example, a hectopascal (hPa).

Similarly, the minimum value denotes a minimum value measurable by the atmospheric pressure sensor using a unit of atmospheric pressure, for example, a hPa.

The location denotes a location of the atmospheric pressure sensor. For example, the location of the atmospheric pressure sensor may be expressed using the global coordinate according to the x-axis, the y-axis, and the z-axis.

Source 13 denotes a sensor capability related to a velocity sensor using the XML. However, a program source shown in Source 13 is only an example embodiment and does not limit the present disclosure.

[Source 13]

```
<!-- ################################################# -->
<!-- Velocity Sensor capabilitytype              -->
<!-- ################################################# -->
<complexType name="VelocitySensorCapabilityType">
<complexContent>
<extension base="cid:SensorCapabilityBaseType">
</extension>
</complexContent>
</complexType>
```

A velocity sensor capability type is a tool for describing the sensor capability related to the velocity sensor.

The velocity sensor capability type may include sensor capability base attributes related to the velocity sensor.

The velocity capability base attributes related to the velocity sensor may include a maximum value and a minimum value.

The maximum value denotes a maximum value measurable by the velocity sensor using a unit of velocity, for example, m/s.

The minimum value denotes a minimum value measurable by the velocity sensor using a unit of velocity, for example, m/s.

Source 14 denotes a sensor capability related to an angular velocity sensor using the XML. However, a program source shown in Source 14 is only an example embodiment and does not limit the present disclosure.

[Source 14]

```
<!-- ################################################# -->
<!-- Angular Velocity Sensor capabilitytype      -->
<!-- ################################################# -->
<complexType name="AngularVelocitySensorCapabilityType">
<complexContent>
<extension base="cid:SensorCapabilityBaseType">
</extension>
</complexContent>
</complexType>
```

An angular velocity sensor capability type is a tool for describing the sensor capability related to the angular velocity sensor.

The angular velocity sensor capability type may include sensor capability base attributes related to the angular velocity sensor.

The angular velocity capability base attributes related to the angular velocity sensor may include a maximum value and a minimum value.

The maximum value denotes a maximum value measurable by the angular velocity sensor using a unit of angular velocity, for example, radians/s.

The minimum value denotes a minimum value measurable by the angular velocity sensor using a unit of angular velocity, for example, radians/s.

Source 15 denotes a sensor capability related to an angular acceleration sensor using the XML. However, a program source shown in Source 15 is only an example embodiment and does not limit the present disclosure.

[Source 15]

```
<!-- ################################################## -->
<!-- Angular Acceleration Sensor capabilitytype          -->
<!-- ################################################## -->
<complexType name="AngularAccelerationSensorCapabilityType">
<complexContent>
<extension base="cid:SensorCapabilityBaseType">
</extension>
</complexContent>
</complexType>
```

An angular acceleration sensor capability type is a tool for describing the sensor capability related to the angular acceleration sensor.

The angular acceleration sensor capability type may include sensor capability base attributes related to the angular acceleration sensor.

The angular acceleration capability base attributes related to the angular acceleration sensor may include a maximum value and a minimum value.

The maximum value denotes a maximum value measurable by the angular acceleration sensor using a unit of angular acceleration, for example, radians/$s^2$.

The minimum value denotes a minimum value measurable by the angular acceleration sensor using a unit of angular acceleration, for example, radians/$s^2$.

Source 16 denotes a sensor capability related to a force sensor using the XML. However, a program source shown in Source 16 is only an example embodiment and does not limit the present disclosure.

[Source 16]

```
<!-- ################################################## -->
<!-- Force Sensor capability type                        -->
<!-- ################################################## -->
<complexType name="ForceSensorCapabilityType">
<complexContent>
<extension base="cid:SensorCapabilityBaseType">
</extension>
</complexContent>
</complexType>
```

A force sensor capability type is a tool for describing the sensor capability related to the force sensor.

The force sensor capability type may include sensor capability base attributes related to the force sensor.

The force capability base attributes related to the force sensor may include a maximum value and a minimum value.

The maximum value denotes a maximum value measurable by the force sensor using a unit of force, for example, a Newton (N).

The minimum value denotes a minimum value measurable by the force sensor using a unit of force, for example, a N.

Source 17 denotes a sensor capability related to a torque sensor using the XML. However, a program source shown in Source 17 is only an example embodiment and does not limit the present disclosure.

[Source 17]

```
<!-- ################################################## -->
<!-- Torque Sensor capability type                       -->
<!-- ################################################## -->
<complexType name="ForceSensorCapabilityType">
<complexContent>
<extension base="cid:SensorCapabilityBaseType">
</extension>
</complexContent>
</complexType>
```

A torque sensor capability type is a tool for describing the sensor capability related to the torque sensor.

The torque sensor capability type may include sensor capability base attributes related to the torque sensor.

The torque capability base attributes related to the torque sensor may include a maximum value, a minimum value, and a location.

The maximum value denotes a maximum value measurable by the torque sensor using a unit of torque, for example, a Newton millimeter (N-mm).

The minimum value denotes a minimum value measurable by the torque sensor using a unit of torque, for example, a N-mm.

Source 18 denotes a sensor capability related to a pressure sensor using the XML. However, a program source shown in Source 18 is only an example embodiment and does not limit the present disclosure.

[Source 18]

```
<!-- ################################################## -->
<!-- Pressure Sensor capability type                     -->
<!-- ################################################## -->
<complexType name="PressureSensorCapabilityType">
<complexContent>
<extension base="cid:SensorCapabilityBaseType">
</extension>
</complexContent>
</complexType>
```

A pressure sensor capability type is a tool for describing the sensor capability related to the pressure sensor.

The pressure sensor capability type may include sensor capability base attributes related to the pressure sensor.

The pressure capability base attributes related to the pressure sensor may include a maximum value, a minimum value, and a location.

The maximum value denotes a maximum value measurable by the pressure sensor using a unit of pressure, for example, a Pascal (Pa), Atmosphere (atm), PSI, Torr, or any other unit of pressure.

The minimum value denotes a minimum value measurable by the pressure sensor using a unit of pressure, for example, a Pa, atm, PSI, Torr, or any other unit of pressure.

Hereinafter, the sensor adaptation preference will be described in detail.

The sensor adaptation preference denotes information for manipulating a value received from a sensor. That is, the sensor adaptation preference may denote information on preference of a user with respect to a method of adapting sensed information collected from the sensor.

A sensor adaptation preference base type denotes a base type of manipulation information of the user. Depending on embodiments, the sensor adaptation preference base type may be a base abstract type of the metadata related to a sensor adaptation preference commonly applied to all types of sensors, as part of metadata types related to the sensor adaptation preference.

Hereinafter, the sensor adaptation preference and the sensor adaptation preference base type will be described in detail with reference to FIGS. 10 through 12.

Figure 10:
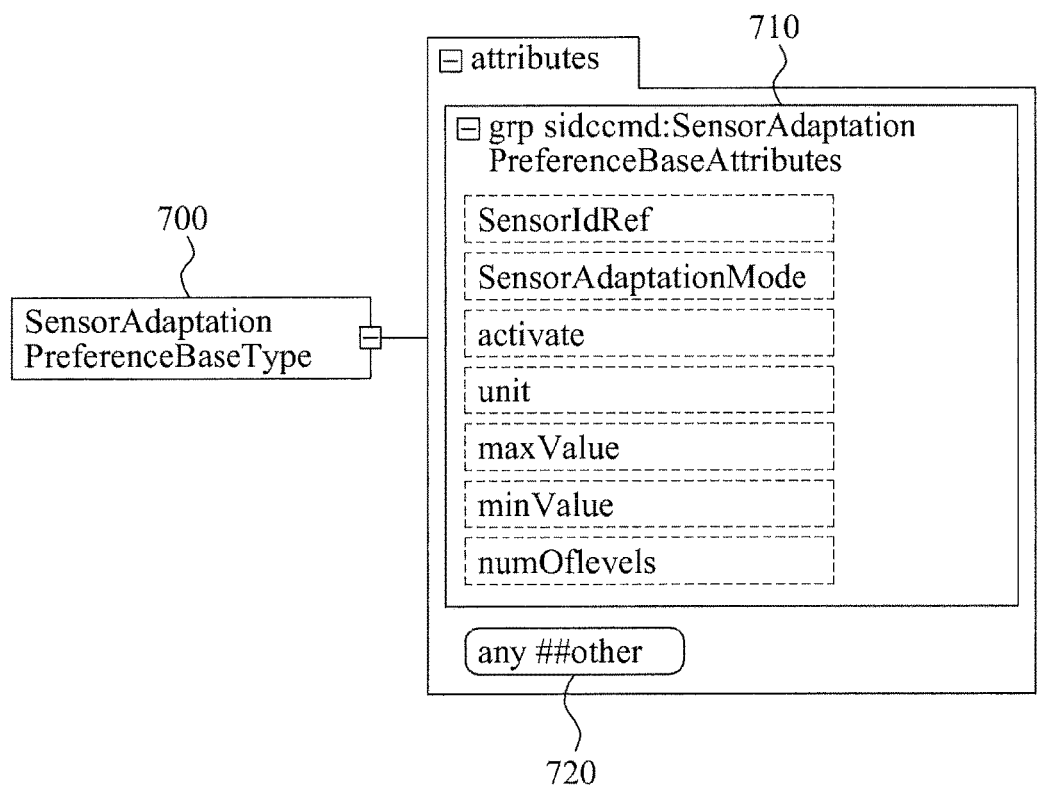
FIG. 10 is a view illustrating a sensor adaptation preference base type, according to example embodiments.

FIG. 10 illustrates a sensor adaptation preference base type 700 according to example embodiments.

Referring to FIG. 10, the sensor adaptation preference base type 700 may include sensor adaptation preference base attributes 710 and any attributes 720.

The sensor adaptation preference base attributes 710 denote a group of sensor adaptation preferences basically included in the sensor adaptation preference base type 700.

The any attributes 720 denote a group of additional sensor adaptation preferences. The any attributes 720 may be unique additional sensor capabilities which are applicable to an arbitrary sensor. The any attributes 420 may allow scalability for inclusion of attributes other than the base attributes.

Figure 11:
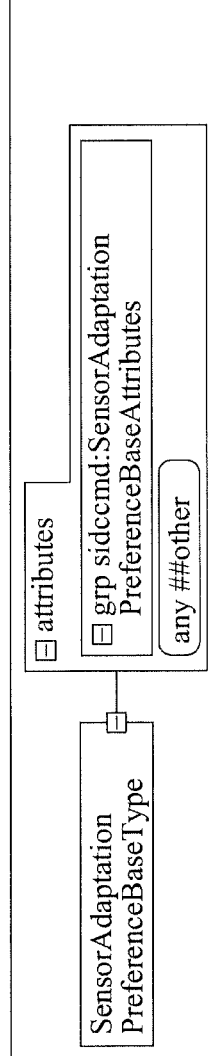
FIG. 11 is a view illustrating syntax of a sensor adaptation preference base type, according to example embodiments.

FIG. 11 illustrates syntax 800 of a sensor adaptation preference base type according to example embodiments.

Referring to FIG. 11, the syntax of the sensor adaptation preference base type may include a diagram 810, attributes 820, and a source 830.

The diagram 810 may include a diagram of the sensor adaptation preference base type.

The attributes 820 may include sensor adaptation preference base attributes and any attributes.

The source 830 may include a program representing the sensor adaptation preference base type using an XML. However, the source 830 shown in FIG. 11 is suggested by way of example and is not limiting.

FIG. 12 illustrates syntax 900 of sensor adaptation preference base attributes according to example embodiments.

Referring to FIG. 12, the syntax 900 of the sensor adaptation preference base attributes may include a diagram 910, attributes 920, and a source 930.

The diagram 910 may include a diagram of the sensor adaptation preference base attributes.

The attributes 920 may include a sensor identifier (ID) reference 901, a sensor adaptation mode 902, an activation state 903, a unit 904, a maximum value 905, a minimum value 906, and a number of levels 907.

The sensor ID reference 901 denotes information referencing an ID of an individual sensor that generates specific sensed information.

The sensor adaptation mode 902 denotes user preference information related to a method of adapting a sensor. Depending on embodiments, the sensor adaptation mode 902 may be a sensor adaptation preference related to an adaptation method that refines information on a motion, state, intention, shape, and the like of a user of a real world, measured through the sensor, and reflects the information to a virtual world. For example, a 'strict' value may denote a user preference that directly applies sensed information of the real world to the virtual world. A 'scalable' value may denote a user preference that varies the sensed information of the real world according to the user preference and applies the sensed information to the virtual world.

The activation state information 903 denotes information on whether to activate the sensor in the virtual world. Depending on embodiments, the activation state information 903 may be a sensor adaptation preference that determines whether the sensor is in operation.

The unit 904 denotes a unit of a value used in the virtual world. For example, the unit 904 may be a pixel. In addition, the unit 904 may be a unit of a value corresponding to the value received from the sensor.

The maximum value 905 and the minimum value 906 denote a maximum value and a minimum value used in the virtual world, respectively. Depending on embodiments, the maximum value 905 and the minimum value 906 may be the unit of the value corresponding to the value received from the sensor.

The number of levels 907 denotes a number of levels used in the virtual world. Depending on embodiments, the number of levels 907 may be a value for dividing levels between the maximum value and the minimum used in the virtual world.

The sensor ID reference 901, the adaptation mode 902, the activation state 903, the unit 904, the maximum value 905, the minimum value 906, and the number of levels 907, as the sensor adaptation preference base attributes, may be rearranged as shown in Table 4.

TABLE 4

| Name | Definition |
| --- | --- |
| SensorIdRef 901 | Refers the ID of an individual sensor that has generated the specific sensed information |
| Sensor adaptation mode 902 | The user's preference on the adaptation method for the virtual world effect |
| Activate 903 | Whether the effect shall be activated. A value of true means the effect shall be activated and false means the effect shall be deactivated |
| Unit 904 | The unit of value |
| maxValue 905 | The maximum desirable value of the effect in percentage according to the max scale defined within the semantics definition of the individual effects |
| minValue 906 | The minimum desirable value of the effect in percentage according to the min scale defined within the semantics definition of the individual effects |
| numOflevels 907 | The number of value levels that the device can provide in between maximum and minimum value |

The source 930 may include a program representing the sensor adaptation preference base attributes using the XML.

For example, a reference numeral 931 defines the activation state 903 using the XML. According to the reference numeral 931, the activation state 903 has "boolean" type data and is optionally used.

As another example, a reference numeral 932 defines the maximum value 905 using the XML. According to the reference numeral 932 the maximum value 905 has "float" type data and is optionally used.

As another example, a reference number 933 defines minimum value 906 using the XML. According to the reference numeral 933, the minimum value 906 has "float" type data and is optionally used.

As another example, a reference numeral 934 defines the number of levels 907 using the XML. According to the reference numeral 934, the number of levels 907 has "onNegativeInteger" type data and is optionally used.

However, the source 930 illustrated in FIG. 12 is only an example embodiment, and thus, is not limiting.

Hereinafter, the sensor adaptation preference will be described in relation to specific embodiments of the sensor.

Source 19 denotes a sensor adaptation preference related to a position sensor using the XML. However, a program source shown in Source 19 is only an example embodiment and does not limit the present disclosure.

[Source 19]

```
<!-- ################################################### -->
<!-Position Sensor Preference type         -->
<!-- ################################################### -->
<complexType name="PositionSensorPrefType">
<complexContent>
<extension base="cid:SensorCapabilityBaseType">
<sequence>
<element name="range" type="cid:RangeType"/>
</sequence>
</extension>
</complexContent>
</complexType>
```

A position sensor type is a tool for describing the sensor adaptation preference related to the position sensor.

A position sensor capability type may include sensor adaptation preference base attributes related to the position sensor.

The sensor adaptation preference base attributes related to the position sensor may include a range and a number of levels.

The range denotes a range of a user preference with respect to position information measured by the position sensor.

The number of levels denotes a number of levels of the user preference with respect to the position information measured by the position sensor.

Source 20 denotes a sensor adaptation preference related to an orientation sensor using the XML. However, a program source shown in Source 20 is only an example embodiment and does not limit the present disclosure.

[Source 20]

```
<!-- ################################################### -->
<!-- Orientation Sensor Preference type       -->
<!-- ################################################### -->
<complexType name="OrientationSensorPrefType">
<complexContent>
<extension base=cid:SensorCapabilityBaseType/>
<sequence>
<element name="orientationrange" type="cid:OrientationRangeType"/>
</sequence>
</extension>
</complexContent>
</complexType>
```

An orientation sensor type is a tool for describing the sensor adaptation preference related to the orientation sensor.

An orientation sensor capability type may include sensor adaptation preference base attributes related to the orientation sensor.

The sensor adaptation preference base attributes related to the orientation sensor may include an orientation range and a number of levels.

The orientation range denotes a range of a user preference with respect to orientation information measured by the orientation sensor.

The number of levels denotes a number of levels of the user preference with respect to the orientation information measured by the orientation sensor.

Source 21 denotes a sensor adaptation preference related to an acceleration sensor using the XML. However, a program source shown in Source 21 is only an example embodiment and does not limit the present disclosure.

[Source 21]

```
<!-- ################################################### -->
<!-- Acceleration Sensor Preference type       -->
<!-- ################################################### -->
<complexType name="AccelerationSensorPrefType">
<complexContent>
<extension base=cid:SensorCapabilityBaseType/>
</complexContent>
</complexType>
```

An acceleration sensor type is a tool for describing the sensor adaptation preference related to the acceleration sensor.

An acceleration sensor capability type may include sensor adaptation preference base attributes related to the acceleration sensor.

The sensor adaptation preference base attributes related to the acceleration sensor may include a maximum value, a minimum value, and a number of levels.

The maximum value denotes a maximum value of a user preference related to acceleration information measured by the acceleration sensor.

The minimum value denotes a minimum value of the user preference related to the acceleration information measured by the acceleration sensor.

The number of levels denotes a number of levels of the user preference with respect to the acceleration information measured by the acceleration sensor.

Source 22 denotes a sensor adaptation preference related to a light sensor using the XML. However, a program source shown in Source 22 is only an example embodiment and does not limit the present disclosure.

[Source 22]

```
<!-- ################################################### -->
<!-- Light Sensor Preference type          -->
<!-- ################################################### -->
<complexType name="LightSensorPrefType">
<complexContent>
<extension base="cid:UserSensorPreferenceBaseType">
<sequence>
<element name="color" type="cid:colorType" minOccurs="0" maxOccurs="unbounded"/>
</sequence>
</extension>
</complexContent>
</complexType>
```

A light sensor type is a tool for describing the sensor adaptation preference related to the light sensor.

A light sensor capability type may include sensor adaptation preference base attributes related to the light sensor.

The sensor adaptation preference base attributes related to the light sensor may include a maximum value, a minimum value, a number of levels, and an unfavorable color.

The maximum value denotes a maximum value of a user preference related to a value measured by the light sensor.

The minimum value denotes a minimum value of the user preference related to a value measured by the light sensor.

The number of levels denotes a number of levels of the user preference with respect to a value measured by the light sensor.

The unfavorable color denotes a list of unfavorable colors of the user, as RGB color values or a classification reference.

Source 23 denotes a sensor adaptation preference related to a sound sensor using the XML. However, a program source shown in Source 23 is only an example embodiment and does not limit the present disclosure.

[Source 23]

```
<!--######################## -->
<!-- USIPV Sound Sensor type   -->
<!--######################## -->
<complexType name="SoundSensorType">
    <complexContent>
        <extension base="usip:PreferenceBaseType"/>
    </complexContent>
</complexType>
```

A sound sensor type is a tool for describing the sensor adaptation preference related to the sound sensor.

A sound sensor capability type may include sensor adaptation preference base attributes related to the sound sensor.

The sensor adaptation preference base attributes related to the sound sensor may include a maximum value and a minimum value.

The maximum value denotes a maximum value allowed by the user as a measured value of the sound sensor.

The minimum value denotes a minimum value allowed by the user as a measured value of the sound sensor.

Source 24 denotes a sensor adaptation preference related to a temperature sensor using the XML. However, a program source shown in Source 24 is only an example embodiment and does not limit the present disclosure.

[Source 24]

```
<!-- ################################################# -->
<!-- Temperature Sensor Preference type         -->
<!-- ################################################# -->
<complexType name="TemperatureSensorPrefType">
<complexContent>
<extension base="cid:UserSensorPreferenceBaseType"/>
</complexContent>
</complexType>
```

A temperature sensor type is a tool for describing the sensor adaptation preference related to the temperature sensor.

A temperature sensor capability type may include sensor adaptation preference base attributes related to the temperature sensor.

The sensor adaptation preference base attributes related to the temperature sensor may include a maximum value, a minimum value, and a number of levels.

The maximum value denotes a maximum value of a user preference related to temperature information measured by the temperature sensor.

The minimum value denotes a minimum value of the user preference related to the temperature information measured by the temperature sensor.

The number of levels denotes a number of levels of the user preference with respect to the temperature information measured by the temperature sensor.

Source 25 denotes a sensor adaptation preference related to a humidity sensor using the XML. However, a program source shown in Source 25 is only an example embodiment and does not limit the present disclosure.

[Source 25]

```
<!-- ################################################# -->
<!-- Humidity Sensor Preference type           -->
<!-- ################################################# -->
<complexType name="HumiditySensorPrefType">
<complexContent>
<extension base="cid:UserSensorPreferenceBaseType"/>
</complexContent>
</complexType>
```

A humidity sensor type is a tool for describing the sensor adaptation preference related to the humidity sensor.

A humidity sensor capability type may include sensor adaptation preference base attributes related to the humidity sensor.

The sensor adaptation preference base attributes related to the humidity sensor may include a maximum value, a minimum value, and a number of levels.

The maximum value denotes a maximum value of a user preference related to humidity information measured by the humidity sensor.

The minimum value denotes a minimum value of the user preference related to the humidity information measured by the humidity sensor.

The number of levels denotes a number of levels of the user preference with respect to the humidity information measured by the humidity sensor.

Source 26 denotes a sensor adaptation preference related to a length sensor using the XML. However, a program source shown in Source 26 is only an example embodiment and does not limit the present disclosure.

[Source 26]

```
<!-- ################################################# -->
<!-- Length Sensor Preference type         -->
<!-- ################################################# -->
<complexType name="LengthSensorPrefType">
<complexContent>
<extension base="cid:UserSensorPreferenceBaseType"/>
</complexContent>
</complexType>
```

A length sensor type is a tool for describing the sensor adaptation preference related to the length sensor.

A length sensor capability type may include sensor adaptation preference base attributes related to the length sensor.

The sensor adaptation preference base attributes related to the length sensor may include a maximum value, a minimum value, and a number of levels.

The maximum value denotes a maximum value of a user preference related to length information measured by the length sensor.

The minimum value denotes a minimum value of the user preference related to the length information measured by the length sensor.

The number of levels denotes a number of levels of the user preference with respect to the length information measured by the length sensor.

Source 27 denotes a sensor adaptation preference related to a motion sensor using the XML. However, a program source shown in Source 27 is only an example embodiment and does not limit the present disclosure.

[Source 27]

```
<!-- ################################################## -->
<!-- Motion Sensor Preference type                  -->
<!-- ################################################## -->
        <complexType name="MotionSensorPrefType">
            <sequence>
                <element name="positionpreference"
type="cid:PositionSensorPrefType" minOccurs="0"/>
                <element name="orientationpreference"
type="cid:OrientationSensorPrefType" minOccurs="0"/>
                <element name="velocitypreference"
type="cid:VelocitySensorPrefType" minOccurs="0"/>
                <element name="angularvelocitypreference"
type="cid:AngularVelocitySensorPrefType" minOccurs="0"/>
                <element name="accelerationpreference"
type="cid:AccelerationSensorPrefType" minOccurs="0"/>
                <element name="angularaccelerationpreference"
type="cid:AngularAccelerationSensorPrefType" minOccurs="0"/>
            </sequence>
        </complexType>
```

A motion sensor capability type is a tool for describing the sensor adaptation preference related to the motion sensor.

The motion sensor capability type may include sensor adaptation preference base attributes related to the motion sensor.

The sensor adaptation preference base attributes related to the motion sensor may include a position preference, a velocity preference, an acceleration preference, an orientation preference, an angular velocity preference, and an angular acceleration preference.

The position preference denotes a user preference with respect to the position.

The velocity preference denotes a user preference with respect to the velocity.

The acceleration preference denotes a user preference with respect to the acceleration.

The orientation preference denotes a user preference with respect to the orientation.

The angular velocity preference denotes a user preference with respect to the angular velocity.

The angular acceleration preference denotes a user preference with respect to the angular acceleration.

Source 28 denotes a sensor adaptation preference related to an intelligent camera sensor using the XML. However, a program source shown in Source 28 is only an example embodiment and does not limit the present disclosure,

[Source 28]

```
<!-- ################################################## -->
<!-- Intelligent Camera Preference Type             -->
<!-- ################################################## -->
<complexType name="IntelligentCameraPreferenceType">
    <complexContent>
        <extension base="cid:SensorAdaptationPreferenceBaseType">
            <sequence>
                <element name="FaceFeatureTrackingOn"
type="boolean" minOccurs="0"/>
                <element name="BodyFeatureTrackingOn"
type="boolean" minOccurs="0"/>
                <element name="FacialExpressionTrackingOn"
type="boolean" minOccurs="0"/>
                <element name="GestureTrackingOn" type="boolean"
minOccurs="0"/>
                <element name="FacialFeatureMask"
type="cid:FacialFeatureMaskType"/>
                <element name="BodyFeatureMask"
type="cid:BodyFeatureMaskType"/>
            </sequence>
        </extension>
```

[Source 28]

```
        </complexContent>
    </complexType>
<complexType name="FacialFeatureMaskType">
    <sequence>
            <element name="Eyes" type="boolean"/>
    <element name="Mouth" type="boolean"/>
    <element name="Nose" type="boolean"/>
    <element name="Ears" type="boolean"/>
        </sequence>
</complexType>
<complexType name="BodyFeatureMaskType">
    <sequence>
            <element name="Head" type="boolean"/>
            <element name="Arms" type="boolean"/>
    <element name="Hands" type="boolean"/>
            <element name="Legs" type="boolean"/>
            <element name="Feet" type="boolean"/>
    <element name="MiddleBody" type="boolean"/>
        </sequence>
</complexType>
```

An intelligent camera sensor capability type is a tool for describing the sensor adaptation preference related to the intelligent camera sensor.

The intelligent camera sensor capability type may include sensor adaptation preference base attributes related to the intelligent camera sensor.

The sensor adaptation preference base attributes related to the intelligent camera sensor may include a face feature tracking on, a body feature tracking on, a facial expression tracking on, a gesture tracking on, a face tracking map, and a body tracking map.

The face feature tracking on denotes information on whether to activate a face feature tracking mode in which an intelligent camera sensor tracks features on a face of the user.

The body feature tracking on denotes information on whether to activate a body feature tracking mode in which the intelligent camera sensor tracks features on a body of the user.

The facial expression tracking on denotes information on user preference with respect to tracking of a facial expression of the user by the intelligent camera sensor.

The gesture tracking on denotes information on user preference with respect to tracking of a gesture of the user by the intelligent camera sensor.

The face tracking map provides a Boolean map related to a face tracking map type. The Boolean map provides face portions that the user wants to track. Depending on embodiments, the Boolean map according to the face tracking map type may provide eyes, a mouth, a noise, and ears as the face portions.

The body tracking map provides a Boolean map related to a body tracking map type. The Boolean map provides body portions that the user wants to track. Depending on embodiments, the Boolean map according to the body tracking map type may provide a head, arms, hands, legs, feet, and a middle body as the body portions.

Source 29 denotes a sensor adaptation preference related to an ambient noise sensor using the XML. However, a program source shown in Source 29 is only an example embodiment and does not limit the present disclosure.

[Source 29]

```
<!-- ############################################ -->
<!-- Ambient Noise Sensor Preference type      -->
<!-- ############################################ -->
<complexType name="AmbientNoiseSensorPrefType">
<complexContent>
<extension base="cid:UserSensorPreferenceBaseType"/>
</complexContent>
</complexType>
```

An ambient noise sensor type is a tool for describing the sensor adaptation preference related to the ambient noise sensor.

An ambient noise sensor capability type may include sensor adaptation preference base attributes related to the ambient noise sensor.

The sensor adaptation preference base attributes related to the ambient noise sensor may include a maximum value, a minimum value, and a number of levels.

The maximum value denotes a maximum value of a user preference with respect to ambient noise information measured by the ambient noise sensor.

The minimum value denotes a minimum value of the user preference with respect to the ambient noise information measured by the ambient noise sensor.

The number of levels denotes a number of levels of the user preference with respect to the ambient noise information measured by the ambient noise sensor.

Source 30 denotes a sensor adaptation preference related to an atmospheric pressure sensor using the XML. However, a program source shown in Source 30 is only an example embodiment and does not limit the present disclosure.

[Source 30]

```
<!-- ############################################ -->
<!-- Atmospheric Pressure Sensor Preference type -->
<!-- ############################################ -->
<complexType name="AtmosphericPressureSensorPrefType">
<complexContent>
<extension base="cid:UserSensorPreferenceBaseType"/>
</complexContent>
</complexType>
```

An atmospheric pressure sensor type is a tool for describing the sensor adaptation preference related to the atmospheric pressure sensor.

An atmospheric pressure sensor capability type may include sensor adaptation preference base attributes related to the atmospheric pressure sensor.

The sensor adaptation preference base attributes related to the atmospheric pressure sensor may include a maximum value, a minimum value, and a number of levels.

The maximum value denotes a maximum value of a user preference with respect to atmospheric pressure information measured by the atmospheric pressure sensor.

The minimum value denotes a minimum value of the user preference with respect to the atmospheric pressure information measured by the atmospheric pressure sensor.

The number of levels denotes a number of levels of the user preference with respect to the atmospheric pressure information measured by the atmospheric pressure sensor.

Source 31 denotes a sensor adaptation preference related to a velocity sensor using the XML. However, a program source shown in Source 31 is only an example embodiment and does not limit the present disclosure.

[Source 31]

```
<!-- ############################################ -->
<!-- Velocity Sensor Preference type           -->
<!-- ############################################ -->
<complexType name="VelocitySensorPrefType">
<complexContent>
<extension base=cid:SensorCapabilityBaseType/>
</complexContent>
</complexType>
```

A velocity sensor type is a tool for describing the sensor adaptation preference related to the velocity sensor.

A velocity sensor capability type may include sensor adaptation preference base attributes related to the velocity sensor.

The sensor adaptation preference base attributes related to the velocity sensor may include a maximum value, a minimum value, and a number of levels.

The maximum value denotes a maximum value of a user preference with respect to velocity information measured by the velocity sensor.

The minimum value denotes a minimum value of the user preference with respect to the velocity information measured by the velocity sensor.

The number of levels denotes a number of levels of the user preference with respect to the velocity information measured by the velocity sensor.

Source 32 denotes a sensor adaptation preference related to an angular velocity sensor using the XML. However, a program source shown in Source 32 is only an example embodiment and does not limit the present disclosure.

[Source 32]

```
<!-- ############################################ -->
<!-Angular Velocity Sensor Preference type     -->
<!-- ############################################ -->
<complexType name="AngularVelocitySensorPrefType">
<complexContent>
<extension base=cid:SensorCapabilityBaseType/>
</complexContent>
</complexType>
```

An angular velocity sensor type is a tool for describing the sensor adaptation preference related to the angular velocity sensor.

An angular velocity sensor capability type may include sensor adaptation preference base attributes related to the angular velocity sensor.

The sensor adaptation preference base attributes related to the angular velocity sensor may include a maximum value, a minimum value, and a number of levels.

The maximum value denotes a maximum value of a user preference with respect to angular velocity information measured by the angular velocity sensor.

The minimum value denotes a minimum value of the user preference with respect to the angular velocity information measured by the angular velocity sensor.

The number of levels denotes a number of levels of the user preference with respect to the angular velocity information measured by the angular velocity sensor.

Source 33 denotes a sensor adaptation preference related to an angular acceleration sensor using the XML. However, a program source shown in Source 33 is only an example embodiment and does not limit the present disclosure.

[Source 33]

```
<!-- ################################################## -->
<!-- Angular Acceleration Sensor Preference type  -->
<!-- ################################################## -->
<complexType name="AngularAccelerationSensorPrefType">
<complexContent>
<extension base=cid:SensorCapabilityBaseType/>
</complexContent>
</complexType>
```

An angular acceleration sensor type is a tool for describing the sensor adaptation preference related to the angular acceleration sensor.

An angular acceleration sensor capability type may include sensor adaptation preference base attributes related to the angular acceleration sensor.

The sensor adaptation preference base attributes related to the angular acceleration sensor may include a maximum value, a minimum value, and a number of levels.

The maximum value denotes a maximum value of a user preference with respect to angular acceleration information measured by the angular acceleration sensor.

The minimum value denotes a minimum value of the user preference with respect to the angular acceleration information measured by the angular acceleration sensor.

The number of levels denotes a number of levels of the user preference with respect to the angular acceleration information measured by the angular acceleration sensor.

Source 34 denotes a sensor adaptation preference related to a force sensor using the XML. However, a program source shown in Source 34 is only an example embodiment and does not limit the present disclosure.

[Source 34]

```
<!-- ################################################## -->
<!-- Force Sensor Preference type Preference type  -->
<!-- ################################################## -->
<complexType name="ForceSensorPrefType">
<complexContent>
<extension base="cid:SensorCapabilityBaseType">
</extension>
</complexContent>
</complexType>
```

A force sensor type is a tool for describing the sensor adaptation preference related to the force sensor.

A force sensor capability type may include sensor adaptation preference base attributes related to the force sensor.

The sensor adaptation preference base attributes related to the force sensor may include a maximum value and, a minimum value, and a number of levels.

The maximum value denotes a maximum value of a user preference with respect to force information measured by the force sensor.

The minimum value denotes a minimum value of the user preference with respect to the force information measured by the force sensor.

The number of levels denotes a number of levels of the user preference with respect to the force information measured by the force sensor.

Source 35 denotes a sensor adaptation preference related to a torque sensor using the XML. However, a program source shown in Source 35 is only an example embodiment and does not limit the present disclosure.

[Source 35]

```
<!-- ################################################## -->
<!-- Torque Sensor Preference type  -->
<!-- ################################################## -->
<complexType name="ForceSensorPrefType">
<complexContent>
<extension base="cid:SensorCapabilityBaseType">
</extension>
</complexContent>
</complexType>
```

A torque sensor type is a tool for describing the sensor adaptation preference related to the torque sensor.

A torque sensor capability type may include sensor adaptation preference base attributes related to the torque sensor.

The sensor adaptation preference base attributes related to the torque sensor may include a maximum value and, a minimum value, and a number of levels.

The maximum value denotes a maximum value of a user preference with respect to torque information measured by the torque sensor.

The minimum value denotes a minimum value of the user preference with respect to the torque information measured by the torque sensor.

The number of levels denotes a number of levels of the user preference with respect to the torque information measured by the torque sensor.

Source 36 denotes a sensor adaptation preference related to a pressure sensor using the XML. However, a program source shown in Source 36 is only an example embodiment and does not limit the present disclosure.

[Source 36]

```
<!-- ################################################## -->
<!-- Pressure Sensor Preference type  -->
<!-- ################################################## -->
<complexType name="PressureSensorPrefType">
<complexContent>
<extension base="cid:SensorCapabilityBaseType">
</extension>
</complexContent>
</complexType>
```

A pressure sensor type is a tool for describing the sensor adaptation preference related to the pressure sensor.

A pressure sensor capability type may include sensor adaptation preference base attributes related to the pressure sensor.

The sensor adaptation preference base attributes related to the pressure sensor may include a maximum value and, a minimum value, and a number of levels.

The maximum value denotes a maximum value of a user preference with respect to pressure information measured by the pressure sensor.

The minimum value denotes a minimum value of the user preference with respect to the pressure information measured by the pressure sensor.

The number of levels denotes a number of levels of the user preference with respect to the pressure information measured by the pressure sensor.

The virtual world processing apparatus according to the example embodiments may include sensed information.

The sensed information denotes information collected by the sensor from the real world. The sensed information according to example embodiments may be information on a command for controlling the sensor. Depending on embodiments, the sensed information may be a command for controlling the sensor so as to reflect the information on the motion, state, intention, shape, and the like of the user of the real world, measured through the sensor, to the virtual world.

Depending on embodiments, the sensed information may serve as a root element for sensed information metadata.

Hereinafter, the sensed information will be described in detail with reference to FIG. 13.

Figure 13:
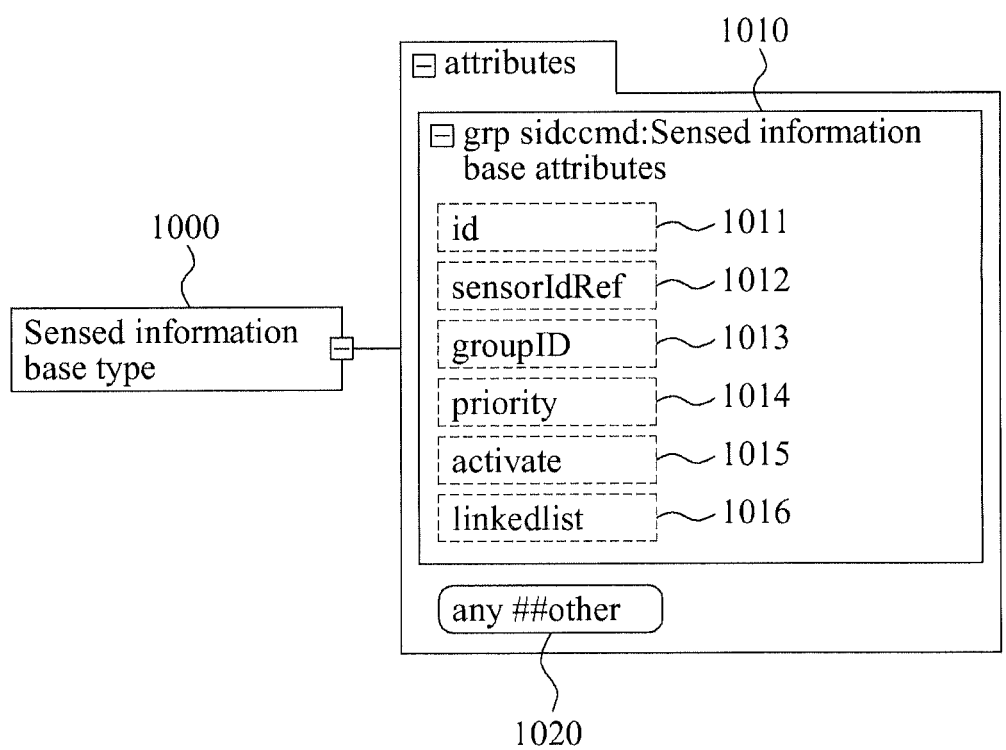
FIG. 13 is a view illustrating a sensed information base type, according to example embodiments.

FIG. 13 illustrates a sensed information base type 1000, according to example embodiments.

Referring to FIG. 13, the sensed information base type 1000 may include sensed information base attributes 1010 and any attributes 1020.

The sensed information base type 1000 may be a topmost type of a base type that may inherit an individual piece of the sensed information.

The sensed information base attributes 1010 denote a group of attributes for the commands.

The any attributes 1020 denote a group of additional sensed information. The any attributes 1020 may be unique additional sensed information applicable to an arbitrary sensor. The any attributes 1020 may allow scalability for inclusion of attributes other than the base attributes.

Source 37 may include a program denoting a sensed information base type using the XML. However, Source 37 is only an example embodiment and does not limit the present disclosure.

[Source 37]

```
<!-- ################################################## -->
<!-- Sensed information base type                   -->
<!-- ################################################## -->
<complexType name="SensedInfoBaseType" abstract="true">
  <attribute name="id" type="ID" use="optional"/>
  <attributeGroup ref="cid:SensedInfoBaseAttributes"/>
  <anyAttribute namespace="##other" processContents="lax"/>
</complexType>
```

The sensed information base attributes 1010 may include an ID 1011, a sensor ID reference 1012, a group ID 1013, a priority 1014, an activation state 1015, and a linked list 1016.

The ID 1011 denotes ID information for recognizing individual identity of the sensed information collected by the sensor.

The sensor ID reference 1012 denotes information referencing the sensor. That is, the sensor ID reference 1012 may be information referencing an ID of the sensor that generates information included in particular sensed information.

The group ID 1013 denotes information for recognizing individual identity of a multi-sensor structure to which the sensor belongs. That is, the group ID 1013 denotes ID information for recognizing individual identity of a multi-sensor structure to which a particular sensor belongs.

The priority 1014 denotes information on a priority related to another sensed information sharing the same point at an adapting time of the sensed information. Depending on embodiments, a value 1 may represent a highest priority and larger values may indicate lower priorities.

The activation state 1015 denotes information for determining whether the sensor is in operation.

The linked list 1016 denotes information on link data for grouping a plurality of sensors. Depending on embodiments, the linked list 1016 may be information on a multi-sensor structure for grouping the sensors by a method including reference information on IDs of neighboring sensors.

Depending on embodiments, the sensed information base attributes 1010 may further include a value, a timestamp, and a life span.

The value denotes a measured value of the sensor. The value may be received from the sensor.

The timestamp denotes information on a sensing time of the sensor.

The life span denotes information on a valid period of a sensor command. Depending on embodiments, the life span may be a second unit.

The sensed information base attributes may be rearranged as shown in Table 5.

TABLE 5

| Name | Definition |
| --- | --- |
| ID 1011 | Individual identity of sensor |
| sensorIdRef 1012 | References a sensor that has generated the information included in this specific sensed information. |
| groupID 1013 | Identifier for a group multi-sensor structure to which this specific sensor belongs. |
| Priority 1014 | Describes the priority for sensed information with respect to other sensed information in the same group of sensors sharing the same point in time when the sensed information become adapted. A value of one indicates the highest priority and larger values indicate lower priorities. |
| Activate 1015 | whether the effect shall be activated. a value of true means the effect shall be activated and false means the effect shall be deactivated. |
| Value | the value of the effect in percentage according to the max scale defined within the semantics definition of the individual effects. |
| Linked list 1016 | grouping sensor structure that consists of a group of sensors such that in each record there is a field that contains a reference (id) to the next sensor. |
| Time stamp | information on a sensing time of the sensor |
| Life span | information on a valid period of a sensor command (expressed with reference to the timestamp in units of second) |

Hereinafter, the sensed information of the sensor will be described in relation to specific embodiments.

Source 38 denotes sensed information related to a position sensor using the XML. However, a program source shown in Source 38 is only an example embodiment and does not limit the present disclosure.

[Source 38]

```
<!--################################### -->
<!--Definition of Position Sensor type -->
<!--################################### -->
<complexType name="PositionSensorType">
  <complexContent>
    <extension base="cid:SensedInfoBaseType">
      <sequence>
        <element name="position"
 type="cid:PositionValueType" minOccurs="0"/>
      </sequence>
      <attribute name="timestamp" type="float"
 use="optional"/>
      <attribute name="lifespan" type="float" use="optional"/>
    </extension>
  </complexContent>
</complexType>
<complexType name="PositionValueType">
```

[Source 38]

```
<sequence>
    <element name="Px" type="float"/>
    <element name="Py" type="float"/>
    <element name="Pz" type="float"/>
</sequence>
</complexType>
```

A position sensor type is a tool for describing sensed information related to the position sensor.

The position sensor type may include attributes such as a timestamp, a life span, a position, a position value type, Px, Py, and Pz.

The timestamp denotes information on a sensing time of the position sensor.

The life span denotes information on a valid period of a command of the position sensor. For example, the life span may be in a unit of seconds.

The position denotes information on a 3-dimensional (3D) value of the position sensor, expressed by a unit of distance, for example, a meter.

The position value type denotes a tool for indicating a 3D position vector.

The Px denotes information on an x-axis value of the position sensor.

The Py denotes information on a y-axis value of the position sensor.

The Pz denotes information on a z-axis value of the position sensor.

Source 39 denotes sensed information related to an orientation sensor using the XML. However, a program source shown in Source 39 is only an example embodiment and does not limit the present disclosure.

[Source 39]

```
<!--######################################-->
<!--Definition of Orientation Sensor type -->
<!--######################################-->
<complexType name="OrientationSensorType">
    <complexContent>
        <extension base="cid:SensedInfoBaseType">
            <sequence>
                <element name="orientation"
type="cid:OrientationValueType" minOccurs="0"/>
            </sequence>
            <attribute name="timestamp" type="float"
                use="optional"/>
            <attribute name="lifespan" type="float" use="optional"/>
        </extension>
    </complexContent>
</complexType>
<complexType name="OrientationValueType">
    <sequence>
        <element name="Ox" type="float"/>
        <element name="Oy" type="float"/>
        <element name="Oz" type="float"/>
    </sequence>
</complexType>
```

An orientation sensor type is a tool for describing sensed information related to the orientation sensor.

The orientation sensor type may include attributes such as a timestamp, a life span, an orientation, an orientation value type, Ox, Oy, and Oz.

The timestamp denotes information on a sensing time of the orientation sensor.

The life span denotes information on a valid period of a command of the orientation sensor. For example, the life span may be in a unit of seconds.

The orientation denotes information on a 3D value of the orientation sensor, expressed by a unit of orientation, for example, radians.

The orientation value type denotes a tool for indicating a 3D orientation vector.

The Ox denotes information on a value of an x-axis rotation angle of the orientation sensor.

The Oy denotes information on a value of a y-axis rotation angle of the orientation sensor.

The Oz denotes information on a value of a z-axis rotation angle of the orientation sensor.

Source 40 denotes sensed information related to an acceleration sensor using the XML. However, a program source shown in Source 40 is only an example embodiment and does not limit the present disclosure.

[Source 40]

```
<!--######################################-->
<!--Definition of Acceleration Sensor type -->
<!--######################################-->
<complexType name="AccelerationSensorType">
    <complexContent>
        <extension base="cid:SensedInfoBaseType">
            <sequence>
                <element name="acceleration"
type="cid:AccelerationValueType" minOccurs="0"/>
            </sequence>
            <attribute name="timestamp" type="float"
                use="optional"/>
            <attribute name="lifespan" type="float" use="optional"/>
        </extension>
    </complexContent>
</complexType>
<complexType name="AccelerationValueType">
    <sequence>
        <element name="Ax" type="float"/>
        <element name="Ay" type="float"/>
        <element name="Az" type="float"/>
    </sequence>
</complexType>
```

An acceleration sensor type is a tool for describing sensed information related to the acceleration sensor.

The acceleration sensor type may include attributes, such as, a timestamp, a life span, an acceleration, and an acceleration value type, Ax, Ay, and Az.

The timestamp denotes information on a sensing time of the acceleration sensor.

The life span denotes information on a valid period of a command of the acceleration sensor. For example, the life span may be a unit of seconds.

The acceleration denotes information on a value of the acceleration sensor, expressed by a unit of acceleration, for example, $m/s^2$.

The acceleration value type denotes a tool for indicating a 3D acceleration vector.

The Ax denotes information on an x-axis value of the acceleration sensor.

The Ay denotes information on a y-axis value of the acceleration sensor.

The Az denotes information on a z-axis value of the acceleration sensor.

Source 41 denotes sensed information related to a light sensor using the XML. However, a program source shown in Source 41 is only an example embodiment and does not limit the present disclosure.

[Source 41]

```
<!--###################################-->
<!--Definition of Light Sensor type -->
<!--###################################-->
<complexType name="LightSensorType">
    <complexContent>
        <extension base="cid:SensedInfoBaseType">
            <attribute name="timestamp" type="float"
                use="optional"/>
            <attribute name="lifespan" type="float" use="optional"/>
<attribute name="color" type="cid:colorType" use="optional"/>
        </extension>
    </complexContent>
</complexType>
```

A light sensor type is a tool for describing sensed information related to the light sensor.

The light sensor type may include attributes such as a timestamp, a life span, a value, and a color.

The timestamp denotes information on a sensing time of the light sensor.

The lifespan denotes information on a valid period of a command of the light sensor. For example, the life span may be a second unit.

The value denotes information on a light sensor value expressed by a unit of light intensity, for example, LUX.

The color denotes a color that may be provided by the light sensor. For example, the color may be an RGB color value.

Source 42 denotes sensed information related to a sound sensor using the XML. However, a program source shown in Source 42 is only an example embodiment and does not limit the present disclosure.

[Source 42]

```
<!--######################-->
<!-- SCmd Sound Sensor type    -->
<!--######################-->
<complexType name="SoundSensorType">
    <complexContent>
        <extension base="cid: SCmdBaseType"/>
    </complexContent>
</complexType>
```

A sound sensor command type is a tool for describing sensed information related to the sound sensor.

Source 43 denotes sensed information related to a temperature sensor using the XML. However, a program source shown in Source 43 is only an example embodiment and does not limit the present disclosure.

[Source 43]

```
<!--###################################-->
<!--Definition of Temperature Sensor type -->
<!--###################################-->
<complexType name="TemperatureSensorType">
    <complexContent>
        <extension base="cid:SensedInfoBaseType">
            <attribute name="timestamp" type="float" use=
                "optional"/>
            <attribute name="lifespan" type="float" use="optional"/>
        </extension>
    </complexContent>
</complexType>
```

A temperature sensor type is a tool for describing sensed information related to the temperature sensor.

The temperature sensor type may include attributes such as a timestamp, a life span, and a value.

The timestamp denotes information on a sensing time of the temperature sensor.

The life span denotes information on a valid period of a command of the temperature sensor. For example, the life span may be in a unit or seconds.

The value denotes information on a temperature sensor value expressed by a unit of temperature, for example, ° C. and ° F.

Source 44 denotes sensed information related to a humidity sensor using the XML. However, a program source shown in Source 44 is only an example embodiment and does not limit the present disclosure.

[Source 44]

```
<!--###################################-->
<!--Definition of Humidity Sensor type -->
<!--###################################-->
<complexType name="HumiditySensorType">
    <complexContent>
        <extension base="cid:SensedInfoBaseType">
            <attribute name="timestamp" type="float" use=
                "optional"/>
            <attribute name="lifespan" type="float" use="optional"/>
        </extension>
    </complexContent>
</complexType>
```

A humidity sensor type is a tool for describing sensed information related to the humidity sensor.

The humidity sensor type may include attributes such as a timestamp, a life span, and a value.

The timestamp denotes information on a sensing time of the humidity sensor.

The life span denotes information on a valid period of a command of the humidity sensor. For example, the life span may be in a unit of seconds.

The value denotes information on a humidity sensor value expressed by a unit of humidity, for example, %.

Source 45 denotes sensed information related to a length sensor using the XML. However, a program source shown in Source 45 is only an example embodiment and does not limit the present disclosure.

[Source 45]

```
<!--###################################-->
<!--Definition of Length Sensor type -->
<!--###################################-->
<complexType name="LengthSensorType">
    <complexContent>
        <extension base="cid:SensedInfoBaseType">
            <attribute name="timestamp" type="float" use=
                "optional"/>
            <attribute name="lifespan" type="float" use="optional"/>
        </extension>
    </complexContent>
</complexType>
```

A length sensor type is a tool for describing sensed information related to the length sensor.

The length sensor type may include attributes such as a timestamp, a life span, and a value.

The timestamp denotes information on a sensing time of the length sensor.

The life span denotes information on a valid period of a command of the length sensor. For example, the life span may be in a unit of seconds.

The value denotes information on a length sensor value expressed by a unit of length, for example, meters.

Source 46 denotes sensed information related to a length sensor using the XML. However, a program source shown in Source 46 is only an example embodiment and does not limit the present disclosure.

[Source 46]

```
<!-- ################################################## -->
<!-- Definition of Motion Sensor Type        -->
<!-- ################################################## -->
    <complexType name="MotionSensorType">
        <sequence>
            <element name="position" type=
"cid:PositionSensorType" minOccurs="0"/>
            <element name="orientation" type=
"cid:OrienationSensorType" minOccurs="0"/>
            <element name="velocity" type=
"cid:VelocitySensorType" minOccurs="0"/>
            <element name="angularvelocity"
type="cid:AngularVelocitySensorType" minOccurs="0"/>
            <element name="acceleration"
type="cid:AccelerationSensorType" minOccurs="0"/>
            <element name="angularacceleration"
type="cid:AngularAccelerationSensorType" minOccurs="0"/>
        </sequence>
        <attribute name="id" type="ID" use="optional"/>
        <attribute name="idref" type="IDREF" use="optional"/>
    </complexType>
```

A motion sensor type is a tool for describing sensed information related to the length sensor.

The motion sensor type may include attributes such as an ID, an ID reference, a position, a velocity, an acceleration, an orientation, an angular velocity, and an angular acceleration.

The ID denotes ID information for recognizing individual identity of the motion sensor.

The ID reference denotes additional information related to the ID, the additional information for recognizing individual identity of the motion sensor.

The position denotes information on a position vector value of a unit of position, for example, meters.

The velocity denotes information on a velocity vector value of a unit of velocity, for example, m/s.

The acceleration denotes information on an acceleration vector value of a unit of acceleration, for example, $m/s^2$.

The orientation denotes information on an orientation vector value of a unit of orientation, for example, radians.

The angular velocity denotes information on an angular velocity vector value of a unit of angular velocity, for example, radians/s.

The angular acceleration denotes information on an angular acceleration vector value of a unit of angular acceleration, for example, $radians/s^2$.

Source 47 denotes sensed information related to an intelligent camera sensor using the XML. However, a program source shown in Source 47 is only an example embodiment and does not limit the present disclosure.

[Source 47]

```
<!-- ################################################## -->
<!-- Definition of Intelligent Camera Type        -->
<!-- ################################################## -->
<complexType name="IntelligentCameraType">
    <complexContent>
        <extension base="cid:SensorCommandBaseType">
            <sequence>
```

[Source 47]
-continued

```
                <element name="FacialAnimationID" type="IDREF" minOccurs="0"/>
<element name="BodyAnimationID" type="IDREF" minOccurs="0"/>
                <element name="FaceFeature" type=
"cid:PositionValue" minOccurs="0" maxOccurs="255"/>
                <element name="BodyFeature" type=
"cid:PositionValue" minOccurs="0" maxOccurs="255"/>
            </sequence>
        </extension>
        <attribute name="timestamp" type="float" use="optional"/>
        <attribute name="lifespan" type="float" use="optional"/>
    </complexContent>
</complexType>
```

An intelligent camera sensor type is a tool for describing sensed information related to the intelligent camera sensor.

The intelligent camera sensor type may include a facial animation ID, a body animation ID, a face feature, and a body feature.

The facial animation ID denotes an ID referencing an animation clip with respect to a facial expression.

The body animation ID denotes an ID referencing an animation clip with respect to a body.

The face feature denotes information on a 3D position of each face feature sensed by the intelligent camera sensor.

The body feature denotes information on a 3D position of each body feature sensed by the intelligent camera sensor.

Source 48 denotes sensed information related to an ambient noise sensor using the XML. However, a program source shown in Source 48 is only an example embodiment and does not limit the present disclosure.

[Source 48]

```
<!--###################################### -->
<!--Definition of Ambient Noise Sensor type -->
<!--###################################### -->
<complexType name="AmbientNoiseSensorType">
<complexContent>
<extension base="cid:SensedInfoBaseType">
<attribute name="timestamp" type="float" use="optional"/>
<attribute name="lifespan" type="float" use="optional"/>
</extension>
</complexContent>
</complexType>
```

An ambient noise sensor type is a tool for describing sensed information related to the ambient noise sensor.

The ambient noise sensor type may include attributes such as a timestamp, a life span, and a value.

The timestamp denotes information on a sensing time of the ambient noise sensor.

The life span denotes information on a valid period of a command of the ambient noise sensor. For example, the life span may be in a unit of seconds.

The value denotes information on an ambient noise sensor value expressed by a unit of sound intensity, for example, dBs.

Source 49 denotes sensed information related to an atmospheric pressure sensor using the XML. However, a program source shown in Source 49 is only an example embodiment and does not limit the present disclosure.

[Source 49]
```
<!--######################################-->
<!--Definition of Atmospheric Pressure Sensor type -->
<!--######################################-->
<complexType name="AtmosphericPressureSensorType">
<complexContent>
<extension base="cid:SensedInfoBaseType">
<attribute name="timestamp" type="float" use="optional"/>
<attribute name="lifespan" type="float" use="optional"/>
</extension>
</complexContent>
</complexType>
```

An atmospheric pressure sensor type is a tool for describing sensed information related to the atmospheric pressure sensor.

The atmospheric pressure sensor type may include attributes such as a timestamp, a life span, and a value.

The timestamp denotes information on a sensing time of the atmospheric pressure sensor.

The life span denotes information on a valid period of a command of the atmospheric pressure sensor. For example, the life span may be in a unit of seconds.

The value denotes information on an atmospheric pressure sensor value expressed by a unit of atmospheric pressure, for example, a hPa.

Source 50 denotes sensed information related to a velocity sensor using the XML. However, a program source shown in Source 50 is only an example embodiment and does not limit the present disclosure.

[Source 50]
```
<!--######################################-->
<!--Definition of Velocity Sensor type -->
<!--######################################-->
<complexType name="VelocitySensorType">
<complexContent>
<extension base="cid:SensedInfoBaseType">
<sequence>
<element name="velocity" type="cid:VelocityValueType" minOccurs="0"/>
</sequence>
<attribute name="timestamp" type="float" use="optional"/>
<attribute name="lifespan" type="float" use="optional"/>
</extension>
</complexContent>
</complexType>
<complexType name="VelocityValueType">
<sequence>
<element name="Vx" type="float"/>
<element name="Vy" type="float"/>
<element name="Vz" type="float" minOccurs="0"/>
</sequence>
</complexType>
```

A velocity sensor type is a tool for describing sensed information related to the velocity sensor.

The velocity sensor type may include attributes such as a timestamp, a life span, a velocity, a velocity value type, Vx, Vy, and Vz.

The timestamp denotes information on a sensing time of the velocity sensor.

The life span denotes information on a valid period of a command of the velocity sensor. For example, the life span may be in a unit of seconds.

The velocity denotes information on a velocity sensor value expressed by a unit of velocity, for example, m/s.

The velocity value type denotes a tool for indicating a 3D velocity vector.

The Vx denotes information on an x-axis value of the velocity sensor.

The Vy denotes information on a y-axis value of the velocity sensor.

The Vz denotes information on a z-axis value of the velocity sensor.

Source 51 denotes sensed information related to an angular velocity sensor using the XML. However, a program source shown in Source 51 is only an example embodiment and does not limit the present disclosure.

[Source 51]
```
<!--######################################-->
<!--Definition of Angular Velocity Sensor type -->
<!--######################################-->
<complexType name="AngularVelocitySensorType">
<complexContent>
<extension base="cid:SensedInfoBaseType">
<sequence>
<element name="angularvelocity" type="cid:AngularVelocityValueType" minOccurs="0"/>
</sequence>
<attribute name="timestamp" type="float" use="optional"/>
<attribute name="lifespan" type="float" use="optional"/>
</extension>
</complexContent>
</complexType>
<complexType name="AngularVelocityValueType">
<sequence>
<element name="AVx" type="float"/>
<element name="AVy" type="float"/>
<element name="AVz" type="float"/>
</sequence>
</cofmplexType>
```

An angular velocity sensor type is a tool for describing sensed information related to the angular velocity sensor.

The angular velocity sensor type may include attributes such as a timestamp, a life span, an angular velocity, an angular velocity value type, AVx, AVy, and AVz.

The timestamp denotes information on a sensing time of the angular velocity sensor.

The life span denotes information on a valid period of a command of the angular velocity sensor. For example, the life span may be in a unit of seconds.

The angular velocity denotes information on an angular velocity sensor value expressed by a unit of angular velocity, for example, radians.

The angular velocity value type denotes a tool for indicating a 3D angular velocity vector.

The AVx denotes information on a value of an x-axis rotation angular velocity of the angular velocity sensor.

The AVy denotes information on a value of a y-axis rotation angular velocity of the angular velocity sensor.

The AVz denotes information on a value of a z-axis rotation angular velocity of the angular velocity sensor.

Source 52 denotes sensed information related to an angular acceleration sensor using the XML. However, a program source shown in Source 52 is only an example embodiment and does not limit the present disclosure.

[Source 52]
```
<!--######################################-->
<!--Definition of Angular Acceleration Sensor type -->
<!--######################################-->
<complexType name="AngularAccelerationSensorType">
<complexContent>
<extension base="cid:SensedInfoBaseType">
```

[Source 52]

```
    <sequence>
    <element name="angularacceleration" type=
"cid:AngularAccelerationValueType" minOccurs="0"/>
    </sequence>
    <attribute name="timestamp" type="float" use="optional"/>
    <attribute name="lifespan" type="float" use="optional"/>
    </extension>
    </complexContent>
    </complexType>
    <complexType name="AngularAccelerationValueType">
    <sequence>
    <element name="AAx" type="float"/>
    <element name="AAy" type="float"/>
    <element name="AAz" type="float"/>
    </sequence>
    </complexType>
```

An angular acceleration sensor type is a tool for describing sensed information related to the angular acceleration sensor.

The angular acceleration sensor type may include attributes such as a timestamp, a life span, an angular acceleration, an angular acceleration value type, an AAx, an AAy, and an AAz.

The timestamp denotes information on a sensing time of the angular acceleration sensor.

The life span denotes information on a valid period of a command of the angular acceleration sensor. For example, the life span may be in a unit of seconds.

The angular acceleration denotes information on an angular acceleration sensor value expressed by a unit of angular acceleration, for example, radian/s$^2$.

The angular acceleration value type denotes a tool for indicating a 3D angular acceleration vector.

The AAx denotes information on an x-axis value of the angular acceleration sensor.

The My denotes information on a y-axis value of the angular acceleration sensor.

The AAz denotes information on a z-axis value of the angular acceleration sensor.

Source 53 denotes sensed information related to a force sensor using the XML. However, a program source shown in Source 53 is only an example embodiment and does not limit the present disclosure.

[Source 53]

```
<!--##################################### -->
<!--Definition of Force Sensor type -->
<!--##################################### -->
<complexType name="ForceSensorType">
<complexContent>
<extension base="cid:SensedInfoBaseType">
<sequence>
<element name="force" type="cid:ForceValueType" minOccurs="0"/>
</sequence>
<attribute name="timestamp" type="float" use="optional"/>
<attribute name="lifespan" type="float" use="optional"/>
</extension>
</complexContent>
</complexType>
<complexType name=" ForceValueType">
<sequence>
```

[Source 53]

```
<element name="FSx" type="float"/>
<element name="FSy" type="float"/>
<element name="FSz" type="float"/>
</sequence>
</complexType>
```

A force sensor type is a tool for describing sensed information related to the force sensor.

The force sensor type may include attributes such as a timestamp, a life span, a force, a force value type, FSx, FSy, and FSz.

The timestamp denotes information on a sensing time of the force sensor.

The life span denotes information on a valid period of a command of the force sensor. For example, the life span may be in a unit of seconds.

The force denotes information on a force sensor value expressed by a unit of force, for example, N.

The force value type denotes a tool for indicating a 3D force vector.

The FSx denotes information on an x-axis force value of the force sensor.

The FSy denotes information on a y-axis force value of the force sensor.

The FSz denotes information on a z-axis force value of the force sensor.

Source 54 denotes sensed information related to a torque sensor using the XML. However, a program source shown in Source 54 is only an example embodiment and does not limit the present disclosure.

[Source 54]

```
<!--##################################### -->
<!--Definition of Torque Sensor type -->
<!--##################################### -->
<complexType name="TorqueSensorType">
<complexContent>
<extension base="cid:SensedInfoBaseType">
<sequence>
<element name="torque" type="cid:TorqueValueType" minOccurs="0"/>
</sequence>
<attribute name="timestamp" type="float" use="optional"/>
<attribute name="lifespan" type="float" use="optional"/>
</extension>
</complexContent>
</complexType>
<complexType name="TorqueValueType">
<sequence>
<element name="TSx" type="float"/>
<element name="TSy" type="float"/>
<element name="TSz" type="float"/>
</sequence>
</complexType>
```

A torque sensor type is a tool for describing sensed information related to the torque sensor.

The torque sensor type may include attributes such as a timestamp, a life span, a torque, a torque value type, TSx, TSy, and TSz.

The timestamp denotes information on a sensing time of the torque sensor.

The life span denotes information on a valid period of a command of the torque sensor. For example, the life span may be in a unit of seconds.

The torque denotes information on a torque sensor value expressed by a unit of torque, for example, N-mm.

The torque value type denotes a tool for indicating a 3D torque vector.

The TSx denotes information on an x-axis torque value of the torque sensor.

The TSy denotes information on a y-axis torque value of the torque sensor.

The TSz denotes information on a z-axis torque value of the force sensor.

Source 55 denotes sensed information related to a pressure sensor using the XML. However, a program source shown in Source 55 is only an example embodiment and does not limit the present disclosure.

[Source 55]

```
<!--###################################### -->
<!--Definition of Pressure Sensor type -->
<!--###################################### -->
<complexType name="PressureSensorType">
  <complexContent>
    <extension base="cid:SensedInfoBaseType">
      <attribute name="timestamp" type="float" use="optional"/>
      <attribute name="lifespan" type="float" use="optional"/>
    </extension>
  </complexContent>
</complexType>
```

A pressure sensor type is a tool for describing sensed information related to the pressure sensor.

The pressure sensor type may include attributes such as a timestamp, a life span, and a value.

The timestamp denotes information on a sensing time of the pressure sensor.

The life span denotes information on a valid period of a command of the pressure sensor. For example, the life span may be in a unit of seconds.

The value denotes information on a pressure sensor value expressed by a unit of pressure, for example, $N/mm^2$.

Figure 14:
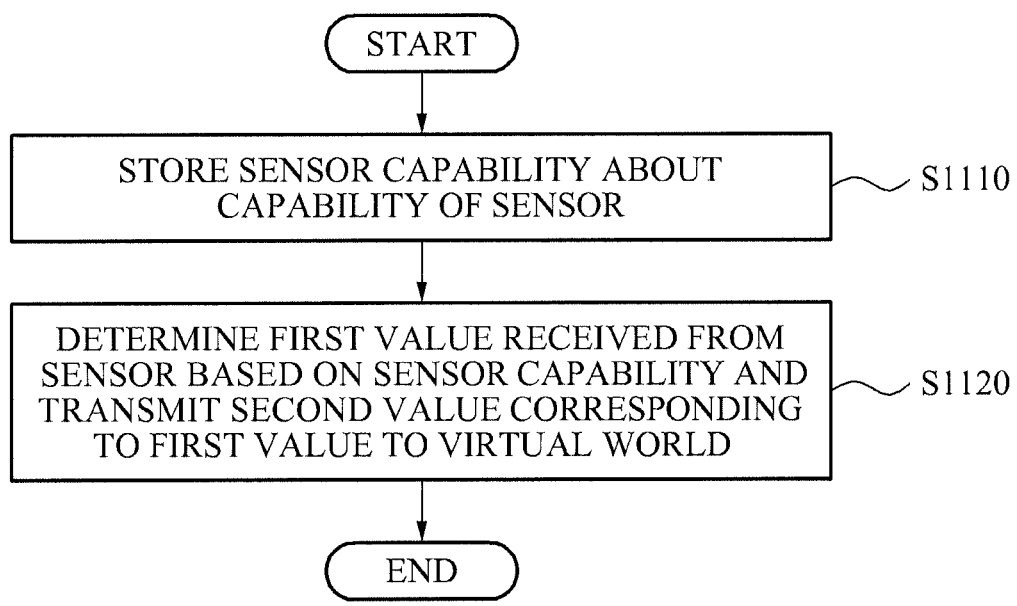
FIG. 14 is a flowchart illustrating a virtual world processing method, according to example embodiments.

FIG. 14 is a flowchart illustrating a virtual world processing method according to example embodiments.

Referring to FIG. 14, the virtual world processing method may store a sensor capability related to capability of a sensor in operation S1110.

In operation S1120, a first value received from the sensor may be determined based on the sensor capability and a second value corresponding to the first value may be transmitted to the virtual world.

Depending on embodiments, the sensor capability may include a maximum value and a minimum value measurable by the sensor. When the first value is less than or equal to the maximum value and greater than or equal to the minimum value, the virtual world processing method may transmit the second value corresponding to the first value to the virtual world.

Depending on embodiments, the sensor capability may include a unit of the first value measured by the sensor. In addition, the sensor capability may include an offset value added to the first value measured by the sensor to obtain an absolute value. The sensor capability may further include a number of values measurable by the sensor. The sensor capability may further include a minimum input value required for the sensor to measure an output value. The sensor capability may further include an SNR of the sensor. The sensor capability may further include an error of the sensor. Additionally, the sensor capability may further include a position of the sensor.

The virtual world processing method may further include an operation (not shown) of storing a sensor adaptation preference for manipulation of the first value received from the sensor. The operation of transmitting the first value may include generating a third value from the first value based on the sensor capability and generating the second value from the third value based on the sensor adaptation preference.

Depending on embodiments, the sensor adaptation preference may include information on a method of applying the sensor adaptation preference to the first value. The sensor adaptation preference may further include information on whether to activate the sensor in the virtual world. The sensor adaptation preference may further include a unit of the second value used in the virtual world. The sensor adaptation preference may further include a maximum value and a minimum value of the second value used in the virtual world. In addition, the sensor adaptation preference may further include a number of the second values used in the virtual world.

Figure 15:
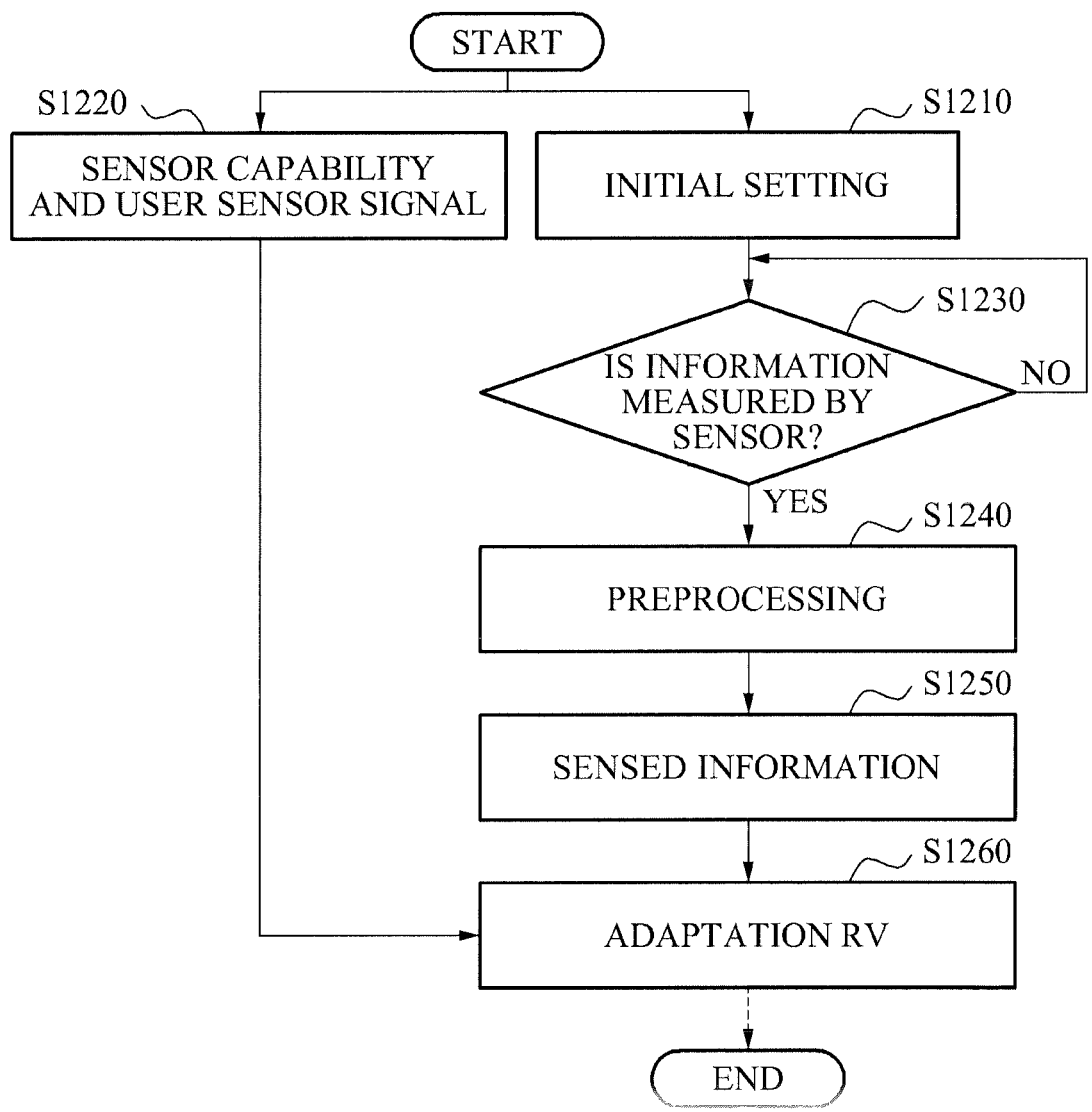
FIG. 15 is a view illustrating a flowchart of a virtual world processing method, according to other example embodiments.

FIG. 15 illustrates a flowchart of a virtual world processing method, according to other example embodiments.

Referring to FIG. 15, the virtual world processing method may perform initial setting to be input with information of a real world from a sensor in operation S1210. Depending on embodiments, the initial setting may be an operation of activating the sensor.

The virtual world processing method may store a sensor capability as information on capability of the sensor and a sensor adaptation preference as information for manipulation of a value received from the sensor, in operation S1220.

The virtual world processing method may measure information on a motion, state, intention, shape, and the like of a user of the real world through the sensor, in operation S1230. When the sensor is incapable of measuring the information, operation S1230 may be repeated until the information is measured.

When the information is measured through the sensor, preprocessing with respect to the information may be performed in operation S1240.

In addition, the virtual world processing method may control the sensor using sensed information which is a command for controlling the sensor in operation S1250.

An adaptation RV may determine a first value received from the sensor based on the sensor capability and transmit a second value corresponding to the first value to a virtual world, in operation S1260, Depending on embodiments, a third value may be generated from the first value based on the sensor capability, the second value may be generated from the third value based on the sensor adaptation preference, and the second value may be transmitted to the virtual world.

Hereinafter, a virtual world processing method according to still other example embodiments will be described.

The virtual world processing method may collect information on a shape of a user of a real world using an intelligent camera sensor.

The information on the shape of the user may include information on at least one of a face, a facial expression, a body movement, and a body shape of the user of the real world.

The intelligent camera sensor may sense the information on the shape of the user of the real world, and transmit sensed information to a virtual world processing apparatus. Here, the virtual world processing method may collect the information on the shape of the user, sensed by a position sensor.

The virtual world processing method may perform adaptation of the collected information with respect to the virtual world, based on a sensor capability of the intelligent camera sensor.

The sensor capability related to the intelligent camera sensor may include at least one selected from a feature tracking status, an expression tracking status, a body movement tracking status, a maximum body feature point, a maximum face feature point, a tracked feature, tracked facial feature points, tracked body feature points, a feature type, a facial feature mask, and a body feature mask.

The virtual world processing method may further include storing a sensor adaptation preference for manipulation of the collected information.

In this case, the virtual world processing method may perform adaptation of the collected information with respect to the virtual world, based on the sensor capability and the sensor adaptation preference. The sensor adaptation preference will be described in detail with reference to FIGS. 10 to 12.

According to example embodiments, the sensor adaptation preference may include at least one selected from a face feature tracking on, a body feature tracking on, a facial expression tracking on, a gesture tracking on, a face tracking map, and a body tracking map.

Figure 16:
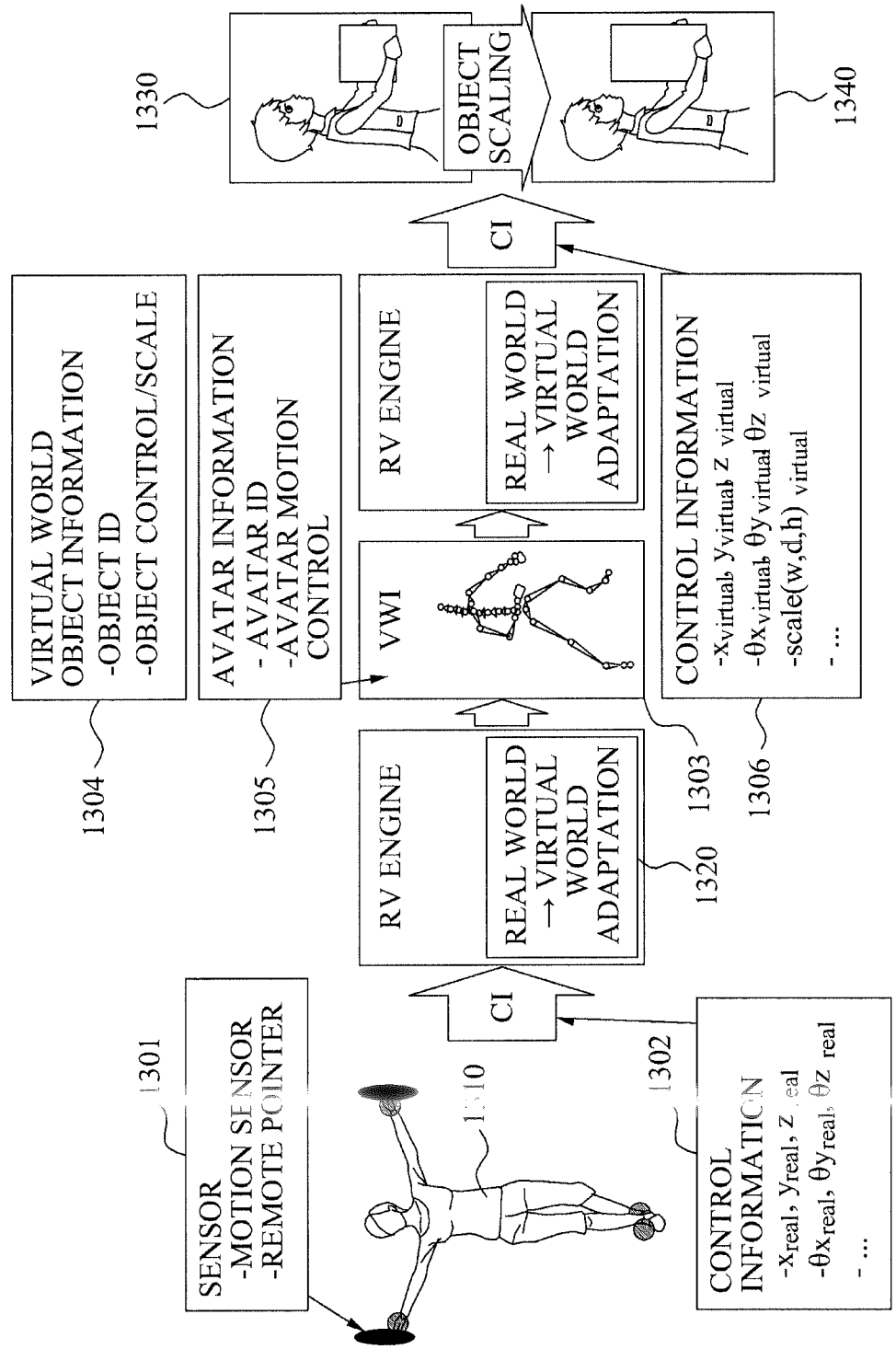
FIG. 16 is a view illustrating an operation of using a virtual world processing apparatus, according to example embodiments.

FIG. 16 illustrates an operation of using a virtual world processing apparatus, according to example embodiments.

Referring to FIG. 16, a user 1310 of a real world may input his or her intention through a sensor 1301. Depending on embodiments, the sensor 1301 may include a motion sensor configured to measure a motion of the user 1310 of the real world, and remote pointers attached to ends of arms and legs of the user 1310 and configured to measure directions and positions indicated by the ends of the arms and legs.

A sensor signal may be transmitted to the virtual world processing apparatus, the sensor signal which includes CI 1302 related to an arm opening motion, a still standing state, positions of hands and feet, an open angle of a hand, and the like of the user 1310.

Depending on embodiments, the CI 1302 may include a sensor capability, a sensor adaptation preference, and sensed information.

Depending on embodiments, the CI 1302 may include position information of the arms and the legs of the user 1310, expressed by $X_{real}$, $Y_{real}$, and $Z_{real}$ denoting values on an x-axis, y-axis, and z-axis and $\Theta_{Xreal}$, $\Theta_{Yreal}$, and $\Theta_{Zreal}$ denoting angles with respect to the x-axis, y-axis, and z-axis.

The virtual world processing apparatus may include an RV engine 1320. The RV engine 1320 may convert information of the real world to information applicable to a virtual world, using the CI 1302 included in the sensor signal.

Depending on embodiments, the RV engine 1320 may convert VWI 1303 using the CI 1302.

The VWI 1303 denotes information on the virtual world. For example, the VWI 1303 may include information on an object of the virtual world or elements constituting the object.

The VWI 1303 may include virtual world object information 1304 and avatar information 1305.

The virtual world object information 1304 denotes information on the object of the virtual world. The virtual world object information 1304 may include an object ID denoting ID information for recognizing identity of the object of the virtual world, and an object control and scale denoting information for controlling a state, size, and the like of the object of the virtual world.

Depending on embodiments, the virtual world processing apparatus may control the virtual world object information 1304 and the avatar information 1305 by a control command. The control command may include commands such as generation, disappearance, copy, and the like. The virtual world processing apparatus may generate the commands by selecting information to be manipulated from the virtual world object information 1304 and the avatar information 1305, along with the control command, and designating an ID corresponding to the selected information.

Source 56 denotes a method of constructing the control command using an XML. However, a program source shown in Source 56 is only an example embodiment and does not limit the present disclosure.

[Source 56]

```
<!-- ############################################### -->
<!-- Definition of Control command for Avatar and virtual object -->
<!-- ############################################### -->
<complexType name="ControlCommand">
    <SimpleContent>
        <attribute name="command" type="cid:commandType" use=
        "required"/>
        <attribute name="Object" type="cid:ObjectType" use=
        "required"/>
        <attribute name="ObjectID" type="ID" use="optional"/>
    </SimpleContent>
</complexType>
<simpleType name="commandType">
<restriction base="string">
    <enumeration value="Create"/>
    <enumeration value="Remove"/>
    <enumeration value="Copy"/>
</restriction>
</simpleType>
<simpleType name="ObjectType">
<restriction base="string">
    <enumeration value="Avatar"/>
    <enumeration value="VirtualObject"/>
</restriction>
</simpleType>
```

The RV engine 1320 may convert the VWI 1303 by applying information on the arm opening motion, the still standing state, the positions of hands and feet, the open angle of a hand, and the like, using the CI 1302.

The RV engine 1320 may transmit information 1306 on the converted VWI to the virtual world. The information 1306 on the converted VWI may include position information of arms and legs of an avatar of the virtual world, expressed by $X_{virtual}$, $Y_{virtual}$, and $Z_{virtual}$ denoting values on the x-axis, y-axis, and z-axis and $\Theta_{Xvirtual}$, $\Theta_{Yvirtual}$, and $\Theta_{Zvirtual}$ denoting angles with respect to the x-axis, y-axis, and z-axis. In addition, the information 1306 may include information on a size of the object of the virtual world, expressed by a scale$(s,d,h)_{virtual}$ denoting a width value, a height value, and a depth value of the object.

Depending on embodiments, in a virtual world 1330 before transmission of the information 1306, the avatar is holding the object. In a virtual world 1340 after transmission of the information 1306, since the arm opening motion, the still standing state, the positions of hands and feet, the open angle of a hand, and the like, are reflected, the avatar of the virtual world may scale up the object.

That is, when the user 1310 of the real world makes a motion of holding and enlarging the object, the CI 1302 related to the arm opening motion, the still standing state, the positions of hands and feet, the open angle of a hand, and the like, may be generated through the sensor 1301. In addition, the RV engine 1320 may convert the CI 1302 related to the user 1310 of the virtual world, which is data measured in the real world, to the information applicable to the virtual world. The converted information may be applied to a structure of information related to the avatar and the object of the virtual world. Therefore, the motion of holding and enlarging the object may be reflected to the avatar, and the object may be enlarged.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the virtual world processing apparatus may include at least one processor to execute at least one of the above-described units and methods.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. An apparatus for processing a virtual world, configured to enable interoperability between the virtual world and a real world, or interoperability between virtual worlds, the apparatus comprising:
 a sensor configured to sense information of the real world; and
 a processor configured to adapt the sensed information, based on
  sensor capability information comprising a maximum value and a minimum value of a parameter pertaining to the sensor, and
  a sensor adaptation preference, regarding manipulating the sensed information;
 wherein the processor is configured to adjust the sensed information based on the sensor capability information,
 wherein in an instance wherein the sensor adaptation preference has a predetermined first value corresponding to a strict mode, the processor is configured to directly apply the adjusted sensed information from the real world to a virtual world, without manipulation,
 wherein in an instance wherein the sensor adaptation preference has a predetermined second value corresponding to a scalable mode, the processor is configured to manipulate the adjusted sensed information from the real world, according to the sensor adaptation preference, before applying the adjusted sensed information to the virtual world;
 wherein the sensor capability information further comprises:
 a number of levels measurable by the sensor, between the maximum value and the minimum value,
 a sensitivity representing a minimum limit of an input signal for generating an output signal, and
 an accuracy representing a degree of closeness of a measured quantity with respect to an actual value; and
 wherein the sensed information comprises:
 group ID information that identifies an individual identity of a multi-sensor structure to which the sensor belongs,
 sensor ID reference information that identifies the sensor,
 linked list that denotes information on link data for grouping a plurality of sensors, and
 priority information of another sensed information sharing a same point at an adapting time of the sensed information.

2. The apparatus of claim 1, wherein, in an instance wherein the sensor comprises a position sensor, the sensor capability information comprises at least one parameter selected from: a range, a range type, an x maximum value, an x minimum value, a y maximum value, a y minimum value, a z maximum value, and a z minimum value of the position sensor.

3. The apparatus of claim 1, wherein, in an instance wherein the sensor comprises an orientation sensor, the sensor capability information comprises at least one parameter selected from: an orientation range, an orientation range type, an x maximum value, an x minimum value, a y maximum value, a y minimum value, a z maximum value, and a z minimum value of the orientation sensor.

4. The apparatus of claim 1, wherein, in an instance wherein the sensor comprises a velocity sensor, the sensor capability information comprises at least one parameter selected from: a maximum value and a minimum value of the velocity sensor.

5. The apparatus of claim 1, wherein, in an instance wherein the sensor comprises an acceleration sensor, the sensor capability information comprises at least one parameter selected from: a maximum value and a minimum value of the acceleration sensor.

6. The apparatus of claim 1, wherein, in an instance wherein the sensor comprises an angular velocity sensor, the sensor capability information comprises at least one parameter selected from: a maximum value and a minimum value of the angular velocity sensor.

7. The apparatus of claim 1, wherein, in an instance wherein the sensor comprises an angular acceleration sensor, the sensor capability information comprises at least one parameter selected from: a maximum value and a minimum value of the angular acceleration sensor.

8. The apparatus of claim 1, wherein, in an instance wherein the sensor comprises a motion sensor, the sensor capability information comprises at least one parameter selected from: a position capability, a velocity capability, an acceleration capability, an orientation capability, an angular velocity capability, and an angular acceleration capability.

9. The apparatus of claim 1, wherein, in an instance wherein the sensor comprises a position sensor, the sensed information comprises at least one parameter selected from: a timestamp, a position, a unit, a 3-dimensional position vector, a position on an x-axis, a position on a y-axis, and a position on a z-axis.

10. The apparatus of claim 1, wherein, in an instance wherein the sensor comprises a velocity sensor, the sensed information comprises at least one parameter selected from: a timestamp, a velocity, a unit, a 3-dimensional velocity vector, a velocity on an x-axis, a velocity on a y-axis, and a velocity on a z-axis.

11. The apparatus of claim 1, wherein, in an instance wherein the sensor comprises an acceleration sensor, the sensed information comprises at least one parameter selected from: a timestamp, an acceleration, a unit, a 3-dimensional acceleration vector, an acceleration on an x-axis, an acceleration on a y-axis, and an acceleration on a z-axis.

12. The apparatus of claim 1, wherein, in an instance wherein the sensor comprises an orientation sensor, the sensed information comprises at least one parameter selected from: a timestamp, an orientation, a unit, a 3-dimensional orientation vector, an orientation of an x-axis, an orientation of a y-axis, and an orientation of a z-axis.

13. The apparatus of claim 1, wherein, in an instance wherein the sensor comprises an angular velocity sensor, the sensed information comprises at least one parameter selected from: a timestamp, an angular velocity, a unit, a 3-dimensional angular velocity vector, an angular velocity on an x-axis, an angular velocity on a y-axis, and an angular velocity on a z-axis.

14. The apparatus of claim 1, wherein, in an instance wherein the sensor comprises an angular acceleration sensor, the sensed information comprises at least one parameter selected from: a timestamp, an angular acceleration, a unit, a 3-dimensional angular acceleration vector, an angular acceleration on an x-axis, an angular acceleration on a y-axis, and an angular acceleration on a z-axis.

15. The apparatus of claim 1, wherein, in an instance wherein the sensor comprises a motion sensor, the sensed information comprises at least one parameter selected from: a position, a velocity, an acceleration, an orientation, an angular velocity, and an angular acceleration.

16. The apparatus of claim 1, wherein, in an instance wherein the sensor comprises a position sensor, the sensor adaptation preference comprises at least one parameter selected from: a range and a number of levels of the position sensor.

17. The apparatus of claim 1, wherein, in an instance wherein the sensor comprises an orientation sensor, the sensor adaptation preference comprises at least one parameter selected from: an orientation range and a number of levels of the orientation sensor.

18. The apparatus of claim 1, wherein, in an instance wherein the sensor comprises a velocity sensor, the sensor adaptation preference comprises at least one parameter selected from: a maximum value, a minimum value, and a number of levels of the velocity sensor.

19. The apparatus of claim 1, wherein, in an instance wherein the sensor comprises an acceleration sensor, the sensor adaptation preference comprises at least one parameter selected from: a maximum value, a minimum value, and a number of levels of the acceleration sensor.

20. The apparatus of claim 1, wherein, in an instance wherein the sensor comprises an angular velocity sensor, the sensor adaptation preference comprises at least one parameter selected from: a maximum value, a minimum value, and a number of levels of the angular velocity sensor.

21. The apparatus of claim 1, wherein, in an instance wherein the sensor comprises an angular acceleration sensor, the sensor adaptation preference comprises at least one parameter selected from: a maximum value, a minimum value, and a number of levels of the angular acceleration sensor.

22. The apparatus of claim 1, wherein, in an instance wherein the sensor comprises a motion sensor, the sensor adaptation preference comprises at least one parameter selected from: a position preference, a velocity preference, an acceleration preference, an orientation preference, an angular velocity preference, and an angular acceleration preference.

23. The apparatus of claim 1, wherein the sensor comprises an intelligent camera sensor, the sensor capability information comprises at least one parameter selected from: a feature tracking status, an expression tracking status, a body movement tracking status, a maximum body feature point, a maximum face feature point, a tracked feature, tracked facial feature points, tracked body feature points, a feature type, a facial feature mask, and a body feature mask of the intelligent camera sensor.

24. The apparatus of claim 1, wherein, in an instance wherein the sensor comprises an intelligent camera sensor, the sensed information comprises at least one of: a facial animation ID, a body animation ID, a face feature, a body feature, and a timestamp.

25. The apparatus of claim 1, wherein the sensor adaptation preference comprises at least one parameter selected from: a face feature tracking on, a body feature tracking on, a facial expression tracking on, a gesture tracking on, a face tracking map, and a body tracking map of the intelligent camera sensor.

26. The apparatus of claim 1, wherein, in an instance wherein the sensor comprises a light sensor, the sensor capability information comprises at least one parameter selected from: a maximum value, a minimum value, a color, and a location of the light sensor.

27. The apparatus of claim 1, wherein, in an instance wherein the sensor comprises an ambient noise sensor, the sensor capability information comprises at least one parameter selected from: a maximum value, a minimum value, and a location of the ambient noise sensor.

28. The apparatus of claim 1, wherein, in an instance wherein the sensor comprises a temperature sensor, the sensor capability information comprises at least one parameter selected from: a maximum value, a minimum value, and a location of the temperature sensor.

29. The apparatus of claim 1, wherein, in an instance wherein the sensor comprises a humidity sensor, the sensor capability information comprises at least one parameter selected from: a maximum value, a minimum value, and a location of the humidity sensor.

30. The apparatus of claim 1, wherein, in an instance wherein the sensor comprises a length sensor, the sensor capability information comprises at least one parameter selected from: a maximum value, a minimum value, and a location of the length sensor.

31. The apparatus of claim 1, wherein, in an instance wherein the sensor comprises an atmospheric pressure sensor, the sensor capability information comprises at least one parameter selected from: a maximum value, a minimum value, and a location of the atmospheric pressure sensor.

32. The apparatus of claim 1, wherein, in an instance wherein the sensor comprises a force sensor, the sensor capability information comprises at least one parameter selected from: a maximum value and a minimum value of the force sensor.

33. The apparatus of claim 1, wherein, in an instance wherein the sensor comprises a torque sensor, the sensor capability information comprises at least one parameter selected from: a maximum value, a minimum value, and a location of the torque sensor.

34. The apparatus of claim 1, wherein, in an instance wherein the sensor comprises a pressure sensor, the sensor capability information comprises at least one parameter selected from: a maximum value, a minimum value, and a location of the pressure sensor.

35. The apparatus of claim 1, wherein, in an instance wherein the sensor comprises a sound sensor, the sensor capability information comprises at least one parameter selected from: a maximum value and a minimum value of the sound sensor.

36. The apparatus of claim 1, wherein, in an instance wherein the sensor comprises a light sensor, the sensed information comprises at least one parameter selected from: a timestamp, a value, a unit, and a color of the light sensor.

37. The apparatus of claim 1, wherein, in an instance wherein the sensor comprises an ambient noise sensor, the sensed information comprises at least one parameter selected from: a timestamp, a lifespan, a unit, and a value of the ambient noise sensor.

38. The apparatus of claim 1, wherein, in an instance wherein the sensor comprises a temperature sensor, the sensed information comprises at least one parameter selected from: a timestamp, a unit, and a value of the temperature sensor.

39. The apparatus of claim 1, wherein, in an instance wherein the sensor comprises a humidity sensor, the sensed information comprises at least one parameter selected from: a timestamp, a unit, and a value of the humidity sensor.

40. The apparatus of claim 1, wherein, in an instance wherein the sensor comprises a length sensor, the sensed information comprises at least one parameter selected from: a timestamp, a unit, and a value of the length sensor.

41. The apparatus of claim 1, wherein, in an instance wherein the sensor comprises an atmospheric pressure sensor, the sensed information comprises at least one parameter selected from: a timestamp, a unit, and a value of the atmospheric pressure sensor.

42. The apparatus of claim 1, wherein, in an instance wherein the sensor comprises a force sensor, the sensed information comprises at least one parameter selected from: a timestamp, a force, a unit, a 3D force vector, a force on an x-axis, a force on a y-axis, and a force on a z-axis of the force sensor.

43. The apparatus of claim 1, wherein, in an instance wherein the sensor comprises a torque sensor, the sensed information comprises at least one parameter selected from: a timestamp, a torque, a unit, a 3D torque vector, a torque on an x-axis, a torque on a y-axis, and a torque on a z-axis of the torque sensor.

44. The apparatus of claim 1, wherein, in an instance wherein the sensor comprises a pressure sensor, the sensed information comprises at least one parameter selected from: a timestamp, a unit, and a value of the pressure sensor.

45. The apparatus of claim 1, wherein, in an instance wherein the sensor comprises a sound sensor, the sensed information comprises at least one parameter selected from: a maximum value and a minimum value of the sound sensor.

46. The apparatus of claim 1, wherein, in an instance wherein the sensor comprises a light sensor, the sensor adaptation preference comprises at least one parameter selected from: a maximum value, a minimum value, a number of levels, and an unfavorable color of the light sensor.

47. The apparatus of claim 1, wherein, in an instance wherein the sensor comprises an ambient noise sensor, the sensor adaptation preference comprises at least one parameter selected from: a maximum value, a minimum value, and a number of levels of the ambient noise sensor.

48. The apparatus of claim 1, wherein, in an instance wherein the sensor comprises a temperature sensor, the sensor adaptation preference comprises at least one parameter selected from: a maximum value, a minimum value, and a number of levels of the temperature sensor.

49. The apparatus of claim 1, wherein, in an instance wherein the sensor comprises a humidity sensor, the sensor adaptation preference comprises at least one parameter selected from: a maximum value, a minimum value, and a number of levels of the humidity sensor.

50. The apparatus of claim 1, wherein, in an instance wherein the sensor comprises a length sensor, the sensor adaptation preference comprises at least one parameter selected from: a maximum value, a minimum value, and a number of levels of the length sensor.

51. The apparatus of claim 1, wherein, in an instance wherein the sensor comprises an atmospheric pressure sensor, the sensor adaptation preference comprises at least one parameter selected from: a maximum value, a minimum value, and a number of levels of the atmospheric pressure sensor.

52. The apparatus of claim 1, wherein, in an instance wherein the sensor comprises a force sensor, the sensor adaptation preference comprises at least one parameter selected from: a maximum value, a minimum value, and a number of levels of the force sensor.

53. The apparatus of claim 1, wherein, in an instance wherein the sensor comprises a torque sensor, the sensor adaptation preference comprises at least one parameter selected from: a maximum value, a minimum value, and a number of levels of the torque sensor.

54. The apparatus of claim 1, wherein, in an instance wherein the sensor comprises a pressure sensor, the sensor adaptation preference comprises at least one parameter selected from: a maximum value, a minimum value, and a number of levels of the pressure sensor.

55. The apparatus of claim 1, wherein, in an instance wherein the sensor comprises a sound sensor, the sensor adaptation preference comprises at least one parameter selected from: a maximum value and a minimum value of the sound sensor.

56. The apparatus of claim 1, wherein the processor is configured to determine a first value received from the sensor based on the sensor capability information, and output a second value corresponding to the first value, such that the second value is applied to the virtual world.

57. The apparatus of claim 1, wherein the processor is configured to
generate a third value from a first value, based on the sensor capability information; and
generate a second value from the third value, based on the sensor adaptation preference.

* * * * *